US012328509B2

(12) United States Patent
Wozniak et al.

(10) Patent No.: US 12,328,509 B2
(45) Date of Patent: Jun. 10, 2025

(54) ADAPTIVE PANORAMIC VIDEO STREAMING USING COMPOSITE PICTURES

(71) Applicant: MICROSOFT TECHNOLOGY LICENSING, LLC, Redmond, WA (US)

(72) Inventors: Matthew Wozniak, Bellevue, WA (US); Bakkama Srinath Reddy, Redmond, WA (US); Amr Martini, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/940,862

(22) Filed: Sep. 8, 2022

(65) Prior Publication Data

US 2023/0073542 A1    Mar. 9, 2023

Related U.S. Application Data

(60) Continuation of application No. 16/935,476, filed on Jul. 22, 2020, now Pat. No. 11,483,475, which is a
(Continued)

(51) Int. Cl.
*H04N 23/698* (2023.01)
*G06T 11/00* (2006.01)
(Continued)

(52) U.S. Cl.
CPC ......... *H04N 23/698* (2023.01); *G06T 11/003* (2013.01); *G06V 20/40* (2022.01); *H04N 19/184* (2014.11); *H04N 19/33* (2014.11)

(58) Field of Classification Search
None
See application file for complete search history.

(56) References Cited

U.S. PATENT DOCUMENTS

2016/0295128 A1 * 10/2016 Schnittman ............ H04N 7/142
2017/0094262 A1 *  3/2017 Peterson ............... G06T 15/205
(Continued)

FOREIGN PATENT DOCUMENTS

| EP | 1162830 A2 | 12/2001 |
| EP | 2824884 A1 | 1/2015 |
| WO | 2018050606 A1 | 3/2018 |

OTHER PUBLICATIONS

U.S. Appl. No. 16/935,476, filed Jul. 22, 2020.
(Continued)

*Primary Examiner* — Clifford Hilaire
(74) *Attorney, Agent, or Firm* — Newport IP, LLC; Jacob P. Rohwer

(57) ABSTRACT

Innovations in stream configuration operations and playback operations for adaptive streaming of panoramic video are described. The innovations include features of adaptive streaming of panoramic video with composite pictures. For example, a stream configuration tool splits an input picture of panoramic video into multiple sections and creates multiple composite pictures. A composite picture includes one of the sections as well as a low-resolution version of the input picture. A playback tool reconstructs one or more composite pictures. Under normal operation, the playback tool can use the reconstructed section(s) of the composite picture(s) to render high-quality views of the panoramic video. If the view window dramatically changes, however, or if encoded data for a section is lost or corrupted, the playback tool can use the low-resolution version of the input
(Continued)

picture to render lower-quality details for views of the panoramic video, without disruption of playback.

20 Claims, 19 Drawing Sheets

Related U.S. Application Data division of application No. 15/990,548, filed on May 25, 2018, now Pat. No. 10,764,494.

(51) Int. Cl.
    *G06V 20/40*     (2022.01)
    *H04N 19/184*     (2014.01)
    *H04N 19/33*     (2014.01)

(56) References Cited

U.S. PATENT DOCUMENTS

2017/0155912 A1*   6/2017   Thomas ............. H04N 21/6547
2017/0223368 A1    8/2017   Abbas
2018/0205934 A1*   7/2018   Abbas .................. H04N 23/698

OTHER PUBLICATIONS

U.S. Appl. No. 15/990,548, filed May 25, 2018.
"Office Action Issued in European Patent Application No. 19726275.1", Mailed Date: Aug. 31, 2023, 8 Pages.
"Notice of Allowance Issued in European Patent Application No. 19726276.9", Mailed Date: Jun. 20, 2023.
"Office Action Issued in European Patent Application No. 19726276.9", Mailed Date: Oct. 27, 2022, 8 Pages.
"Office Action Issued in European Patent Application No. 19726275.1", Mailed Date: Jul. 20, 2022, 11 Pages.
"Office Action Issued in Indian Patent Application No. 202047050979", Mailed Date: Sep. 1, 2022, 6 Pages.
"Decision to Grant Issued in European Patent Application No. 19726276.9", Mailed Date: Oct. 26, 2023, 2 Pages.
Extended European Search Report received in European Application No. 23211037.9, mailed on Feb. 13, 2024, 9 pages.
Communication pursuant to Article 94(3) received in European Application No. 19726275.1, mailed on Apr. 16, 2025, 4 pages.
Communication pursuant to Article 94(3) Received in European Patent Application No. 23211037.9, mailed on Apr. 22, 2025, 07 pages.

* cited by examiner

FIG. 1
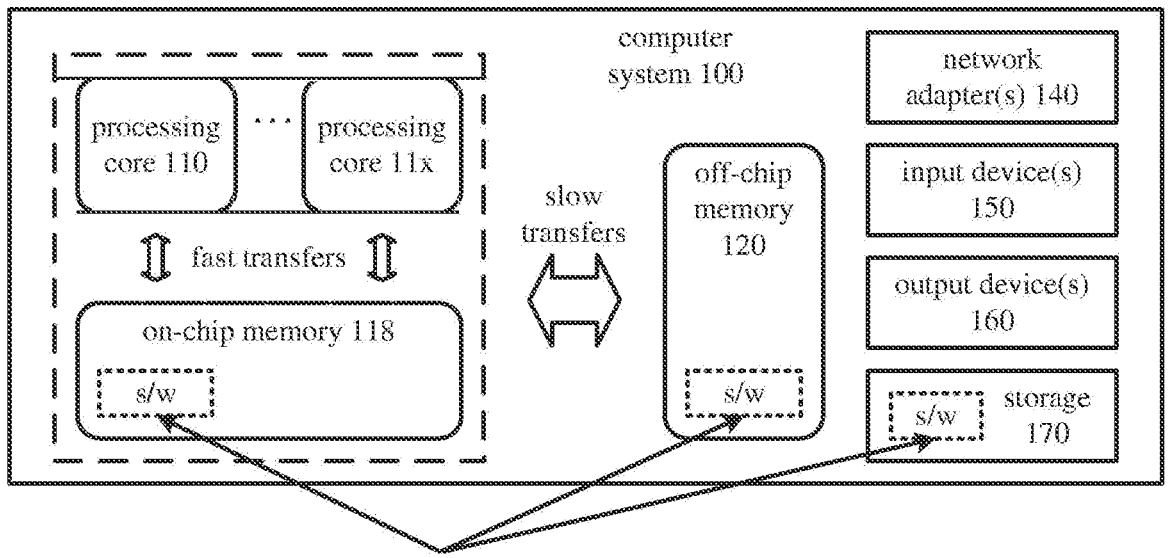
software 180 implementing tools for adaptive panoramic video stream configuration, streaming, and/or playback using overlapping sections and/or composite pictures
FIG. 2a                    201
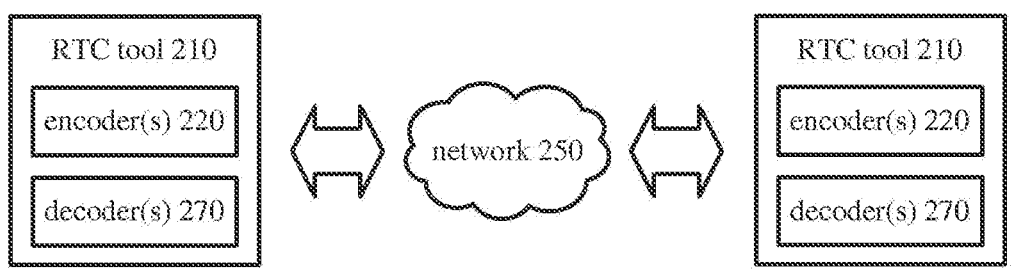
FIG. 2b                    202
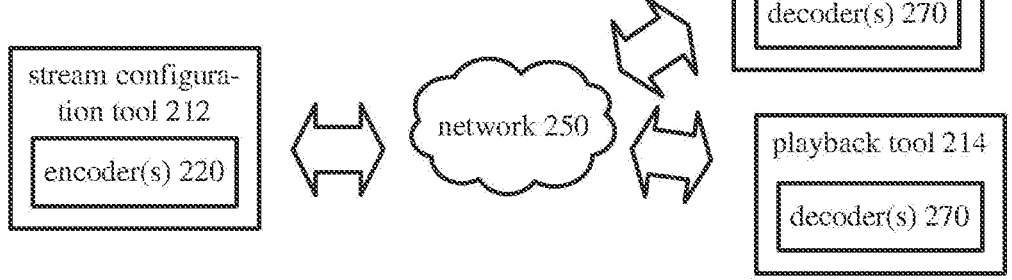

FIG. 3a
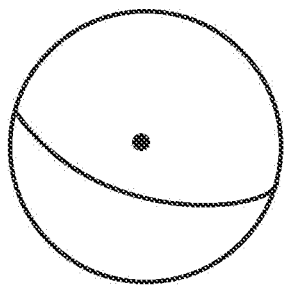
spherical
projection 301
FIG. 3b
equirectangular
projection 302
FIG. 3c
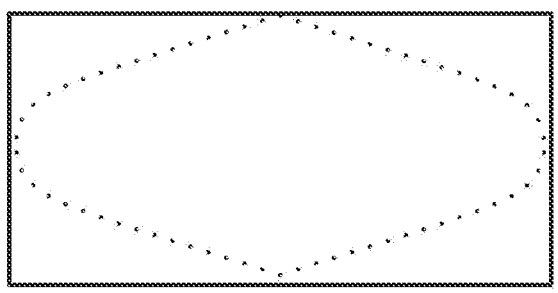
sinusoidal
projection 303
FIG. 3d
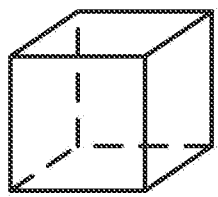
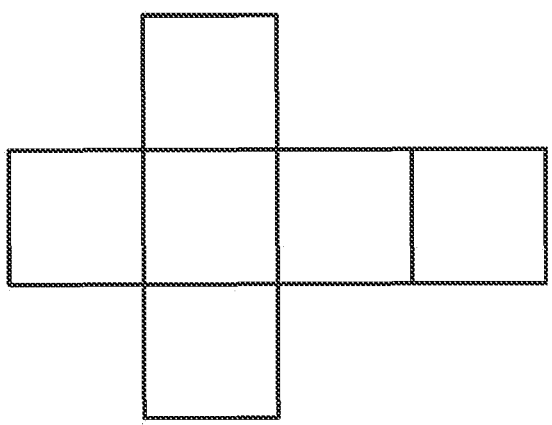
cubemap
projection 304

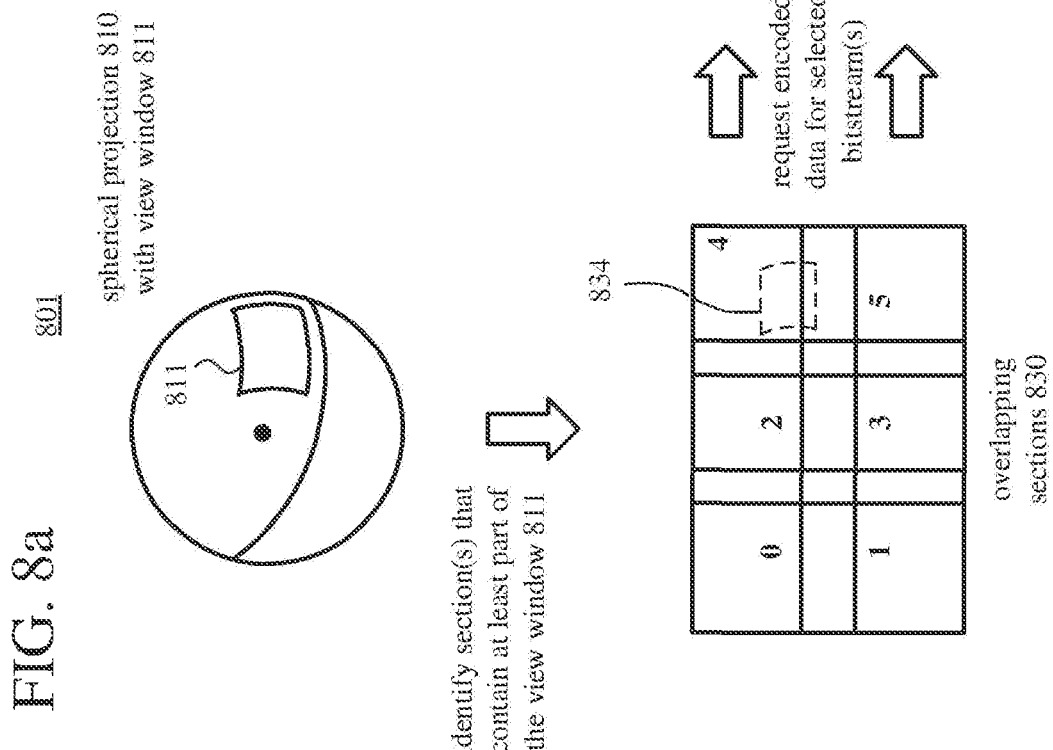

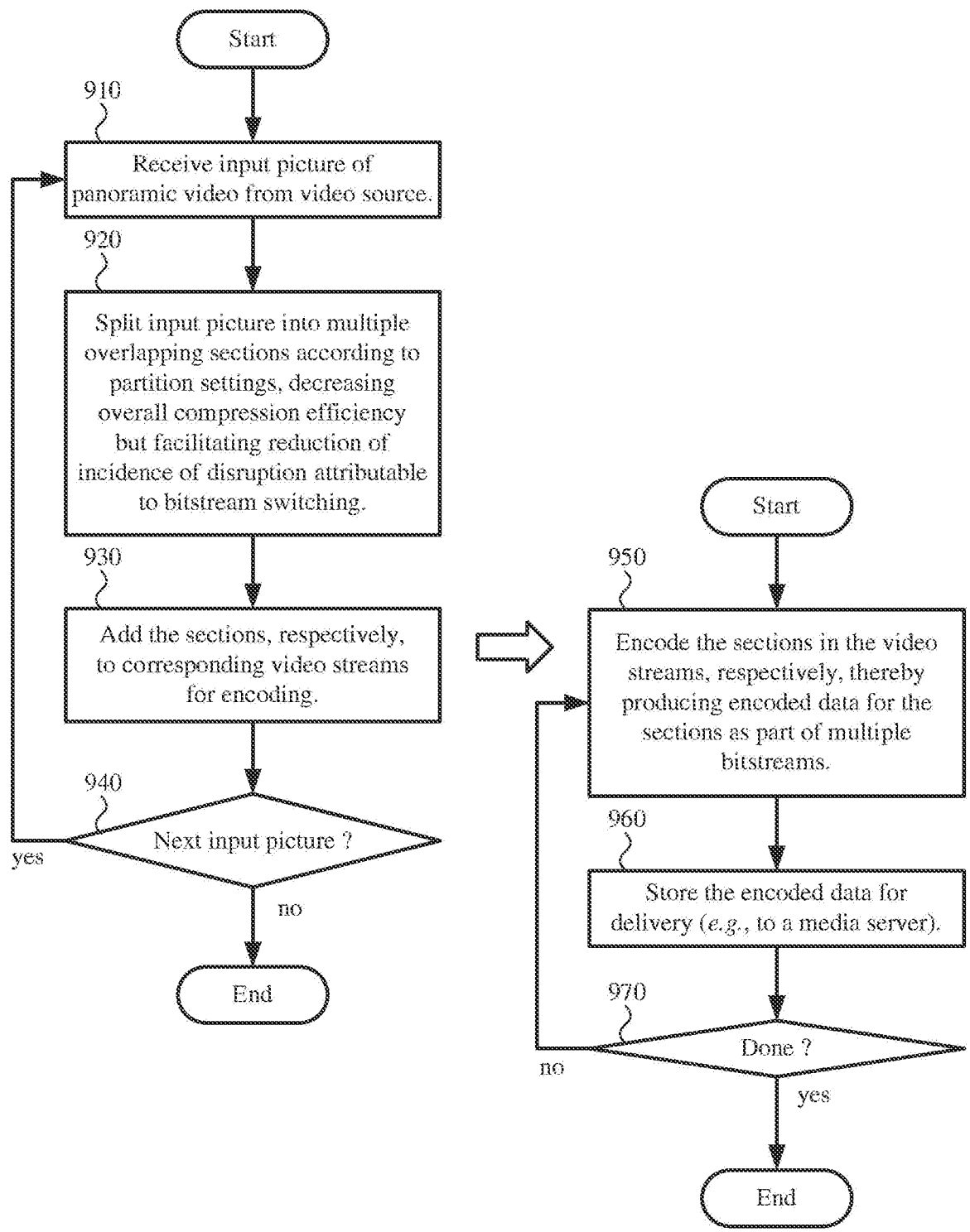

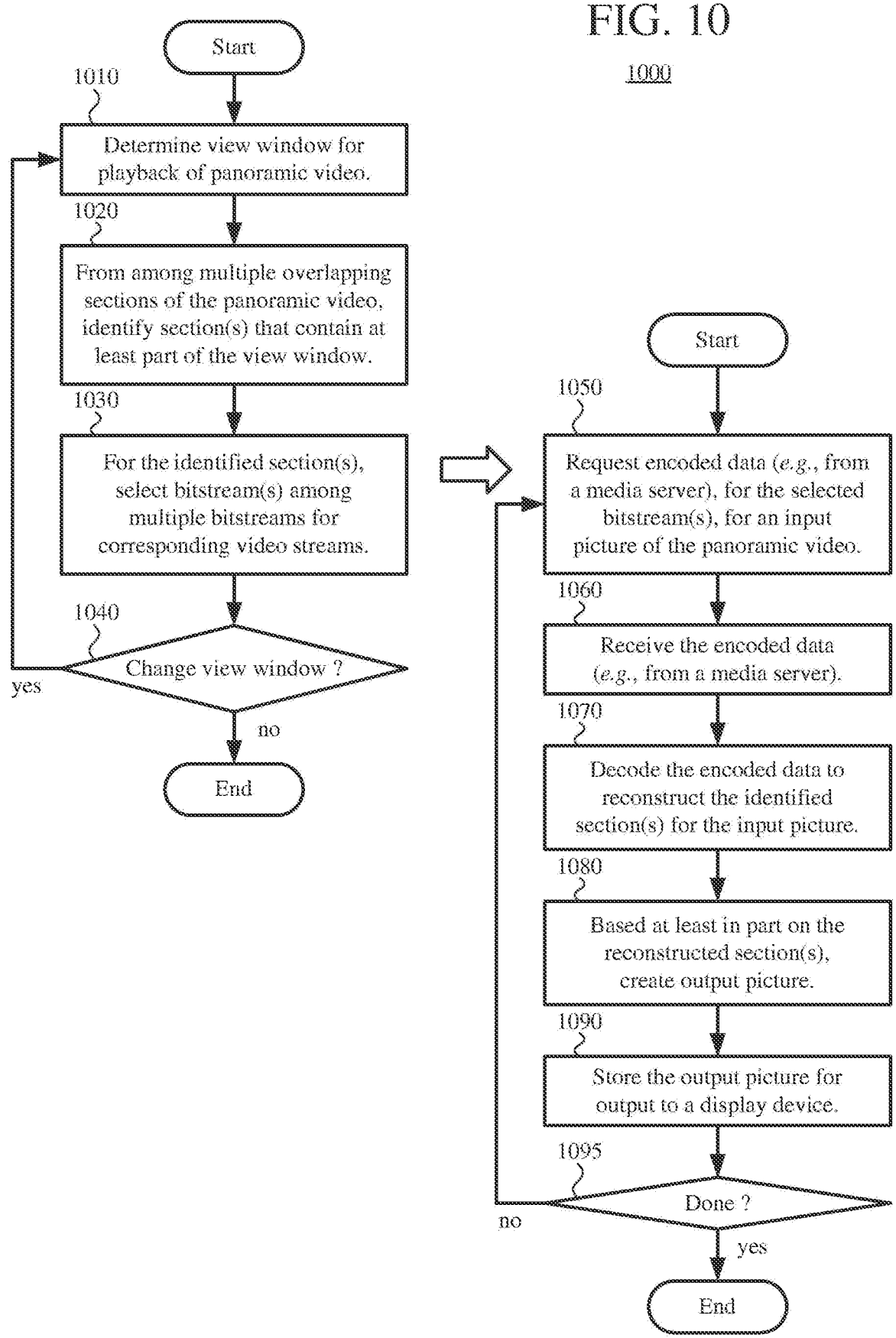

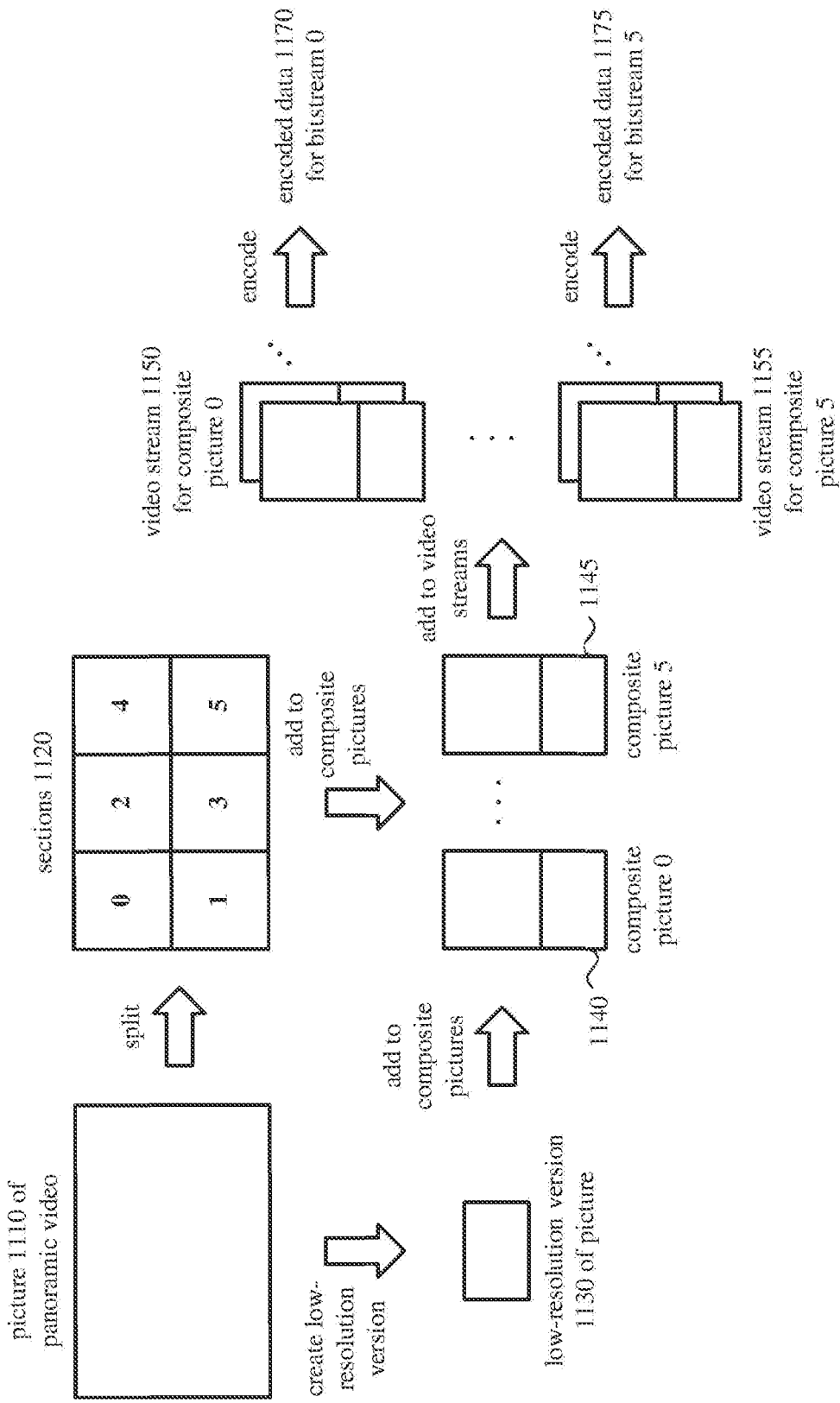

FIG. 13a
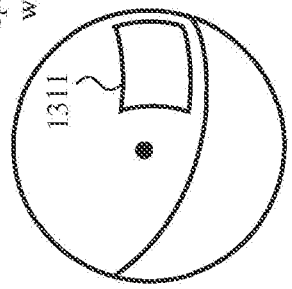
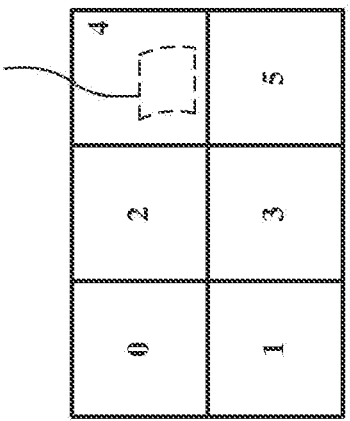

FIG. 13b  1302
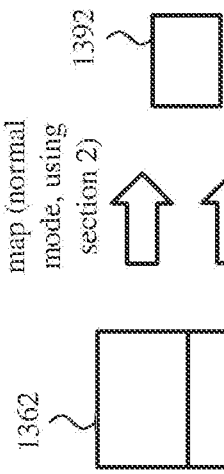
spherical projection 1310 with view window 1311
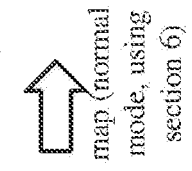
encoded data 1352 for bitstream 2
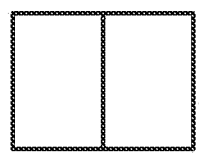
encoded data 1356 for bitstream 6
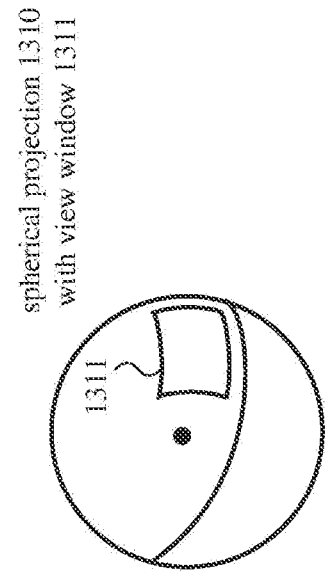
identify section(s) that contain at least part of the view window 1311
overlapping sections 1331
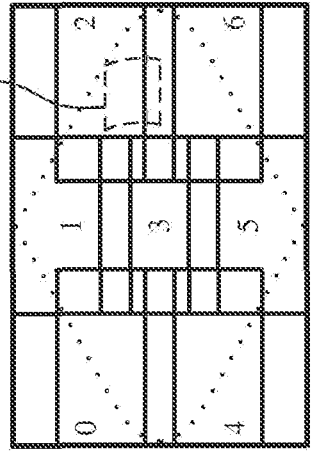
request encoded data for selected bitstream(s)
decode
decode
map (normal mode, using section 2)
map (fallback mode)
map (normal mode, using section 6)
1362
1366
1392

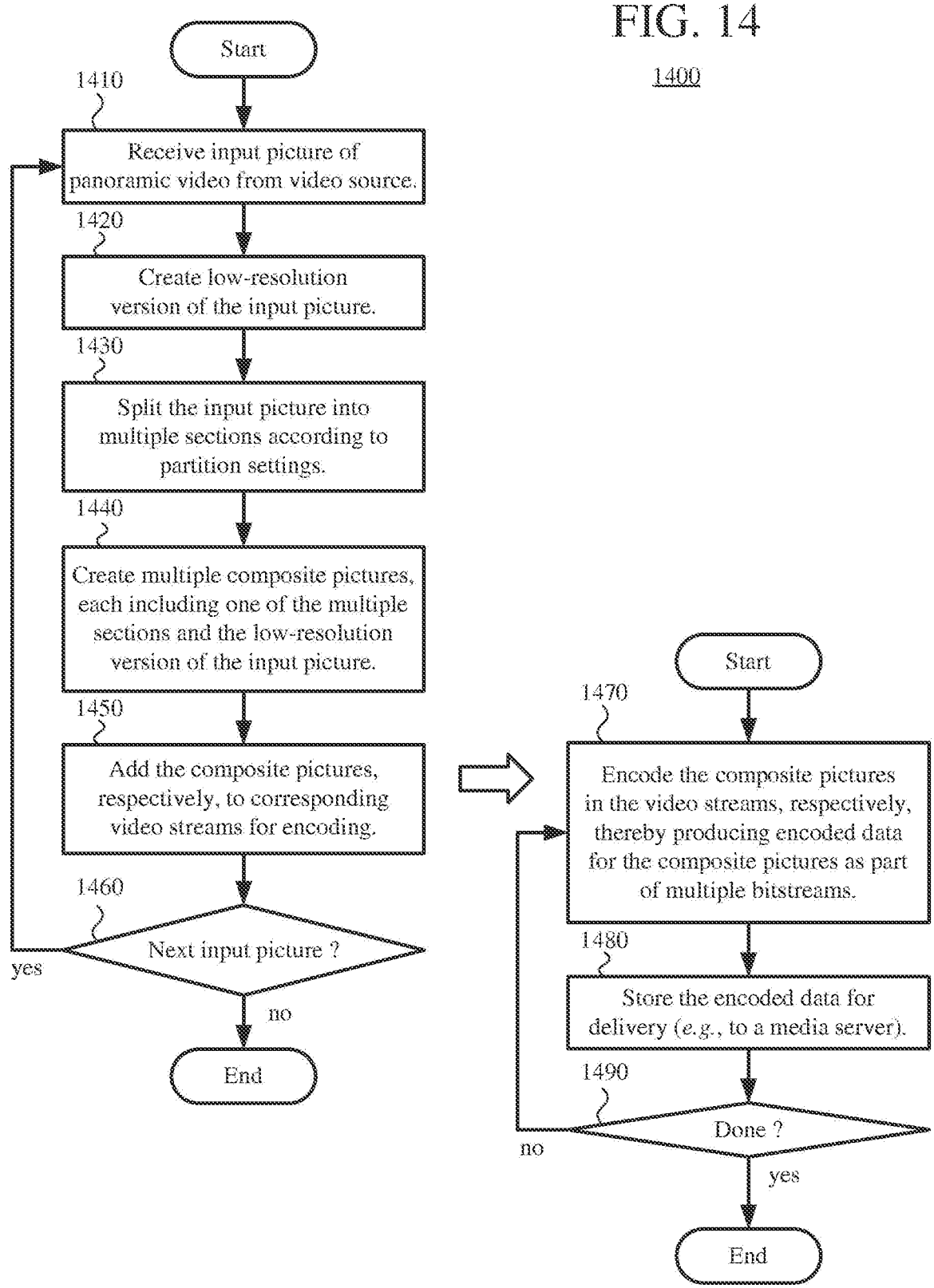

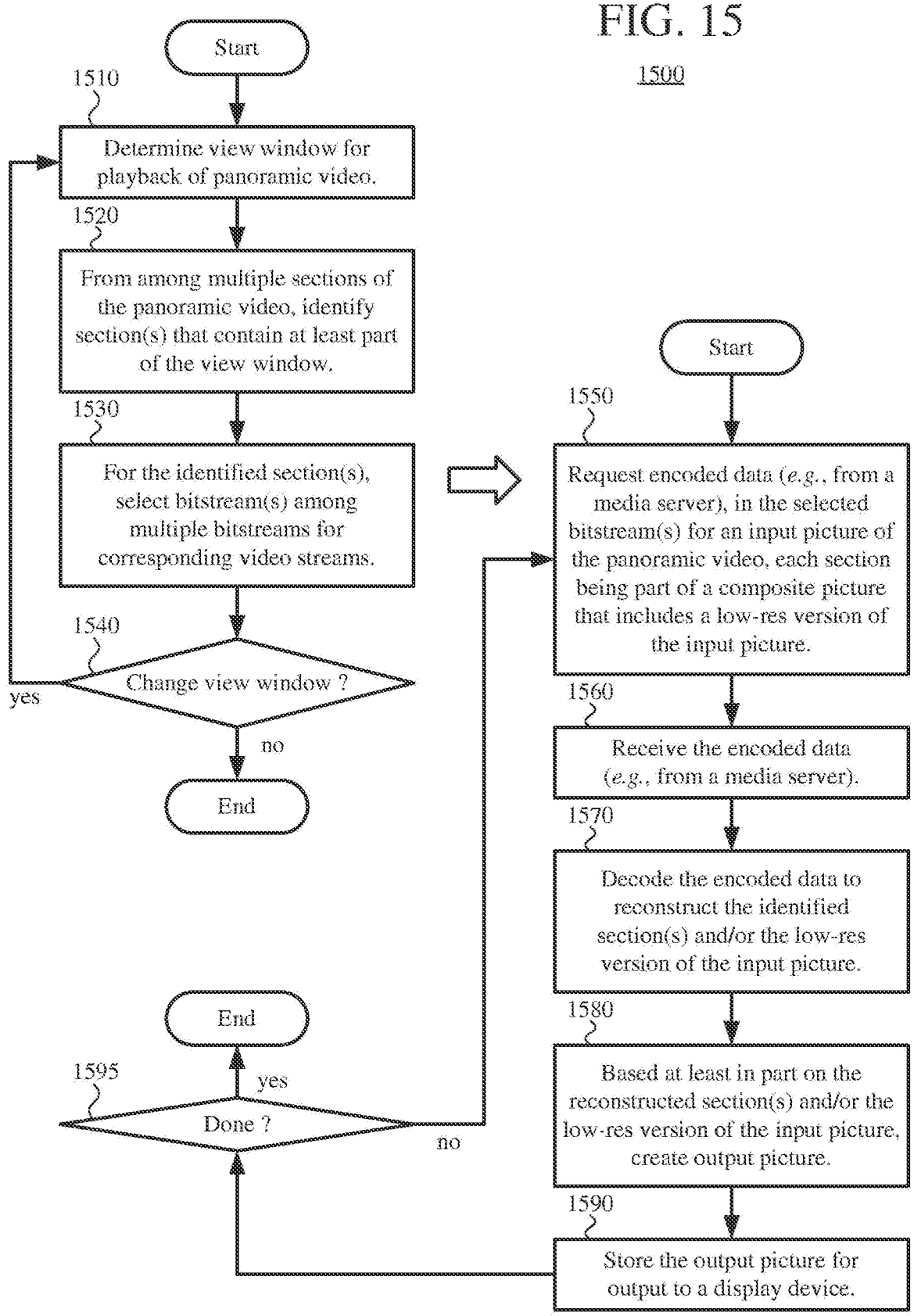

ADAPTIVE PANORAMIC VIDEO STREAMING USING COMPOSITE PICTURES

PRIORITY APPLICATION(S)

This patent application is a continuation of U.S. patent application Ser. No. 16/935,476, filed Jul. 22, 2020, which is a divisional of U.S. patent application Ser. No. 15/990,548, filed May 25, 2018 (now U.S. Pat. No. 10,764,494), which are hereby incorporated in their entirety by reference.

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices. Digital video is also used for technologies such as virtual reality ("VR") and augmented reality ("AR"), whether video is played back in a head-mounted display, mobile device, or other type of device.

Panoramic video is video in which views in multiple directions around a central position are recorded at the same time. The recorded video can include image content in every direction, or at least image content in every direction in a 360-degree circle around the central position, as well as at least some image content above the central position and at least some image content underneath the central position. Panoramic video is sometimes called 360-degree video, immersive video, or spherical video. Panoramic video can be captured using an omnidirectional camera or a collection of multiple cameras pointing in different directions. For modern-day applications, panoramic video is processed in digital form during stages of creation, editing, and delivery, as well as stages of reconstruction and rendering for playback.

During playback, a viewer typically can control a view direction relative to the central position, potentially changing which section of the panoramic video is viewed over time. In some systems, a viewer can also zoom in or zoom out. When panoramic video is rendered for display, the section of the panoramic video that is viewed may be projected to a flat image for output. For a mobile device or computer monitor, a single output picture may be rendered. For a head-mounted display (or mobile device held in a head-mounted band), the section of the panoramic video that is viewed may be projected to two output pictures, for the left and right eyes, respectively.

When a playback tool reconstructs and renders panoramic video, resources may be wasted retrieving and reconstructing image content that is not viewed. For example, memory may be used to store sample values for areas of the panoramic video that are not viewed, and processing cycles may be used to determine the non-viewed sample values and their locations at different stages of processing.

To use fewer resources, a playback tool may retrieve and reconstruct only part (not all) of the panoramic video. For example, considering the view direction and zoom factor for a viewer, the playback tool may retrieve encoded data and reconstruct panoramic video just for those sections of the panoramic video that are visible. In this way, the playback tool may save memory, processing cycles, and other resources while correctly rendering the visible sections of the panoramic video. If the view direction or zoom factor changes, however, the playback tool may not have image content needed to correctly render sections of the panoramic video that should be visible. Playback may freeze or stall until the playback tool can recover by retrieving encoded data and reconstructing panoramic video for the newly visible sections.

SUMMARY

In summary, the detailed description presents innovations in stream configuration operations and playback operations for adaptive streaming of panoramic video. In some example implementations, the innovations can help avoid disruption in playback of panoramic video if a viewer dramatically changes view direction or zoom factor during playback, or if encoded data for a section of panoramic video is lost (e.g., due to network congestion) or corrupted.

According to one aspect of the innovations described herein, a computer system implements a panoramic video stream configuration tool that includes an input buffer, a formatter, one or more video encoders, and one or more output buffers. The input buffer is configured to store an input picture of panoramic video. The formatter is configured to create a low-resolution version of the input picture, split the input picture into multiple sections according to partition settings, and create multiple composite pictures. Each of the composite pictures includes one of the multiple sections and also includes the low-resolution version of the input picture. The formatter is configured to add the composite pictures, respectively, to corresponding video streams. The video encoder(s) are configured to encode the composite pictures in the corresponding video streams, respectively. This produces encoded data for the composite pictures as part of multiple bitstreams for the corresponding video streams, respectively. The output buffer(s) are configured to store the encoded data for delivery. In this way, even if a playback tool retrieves encoded data for only one of the bitstreams, the playback tool has image content (specifically, the low-resolution version of the input picture) that it can use to render views of the panoramic video if the view direction or zoom factor dramatically changes, or if encoded data for a specific section is lost or corrupted. The quality of the rendered views (at least for details created from the low-resolution version of the input picture) may be degraded temporarily, but playback is not disrupted.

According to another aspect of the innovations described herein, a computer system implements a panoramic video playback tool that includes a view controller, a streaming controller, one or more input buffers, one or more video decoders, a mapper, and an output buffer. The view controller is configured to determine a view window for playback of panoramic video. The view controller is further configured to, from among multiple sections of the panoramic video, identify one or more sections that contain at least part of the view window. For the identified section(s), the view controller is configured to select one or more bitstreams among multiple bitstreams for corresponding video streams. The streaming controller is configured to request encoded data, in the selected bitstream(s) for the identified section(s), respectively, for an input picture of the panoramic video. Each of the identified section(s) is part of a composite picture that also includes a low-resolution version of the input picture. The input buffer(s) are configured to store the encoded data. The video decoder(s) are configured to decode the encoded data to reconstruct the identified section(s) for the input picture and/or reconstruct the low-resolution version of the input picture. The mapper is configured to, based at least in part on the reconstructed section(s) and/or the reconstructed low-resolution version of the input picture, create an output picture. Finally, the output buffer is configured to store the output picture for output to a display device. Under normal operation, the playback tool can use the reconstructed section(s) to render high-quality views of the panoramic video. If the view direction or zoom factor dramatically changes, however, or if encoded data for a specific section is lost or corrupted, the playback tool can use the low-resolution version of the input picture to render lower-quality details for views of the panoramic video, without disruption of playback.

The innovations can be implemented as part of a method, as part of a computer system configured to perform the method or as part of tangible computer-readable media storing computer-executable instructions for causing a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram illustrating an example computer system in which some described embodiments can be implemented.

FIGS. 2a and 2b are diagrams illustrating example network environments in which some described embodiments can be implemented.

FIGS. 3a to 3d are diagrams of example projections for a picture of panoramic video.

FIGS. 8a and 8b are diagrams illustrating examples of playback operations for adaptive streaming of panoramic video with overlapping sections.

FIG. 9 is a flowchart illustrating an example technique for stream configuration of panoramic video with overlapping sections.

FIG. 10 is a flowchart illustrating an example technique for playback of panoramic video with overlapping sections.

FIGS. 11a and 11b are diagrams illustrating examples of stream configuration operations for adaptive streaming of panoramic video with composite pictures.

FIGS. 13a and 13b are diagrams illustrating examples of playback operations for adaptive streaming of panoramic video with composite pictures.

FIG. 14 is a flowchart illustrating an example technique for stream configuration of panoramic video with composite pictures.

FIG. 15 is a flowchart illustrating an example technique for playback of panoramic video with composite pictures.

DETAILED DESCRIPTION

Figure 3E:
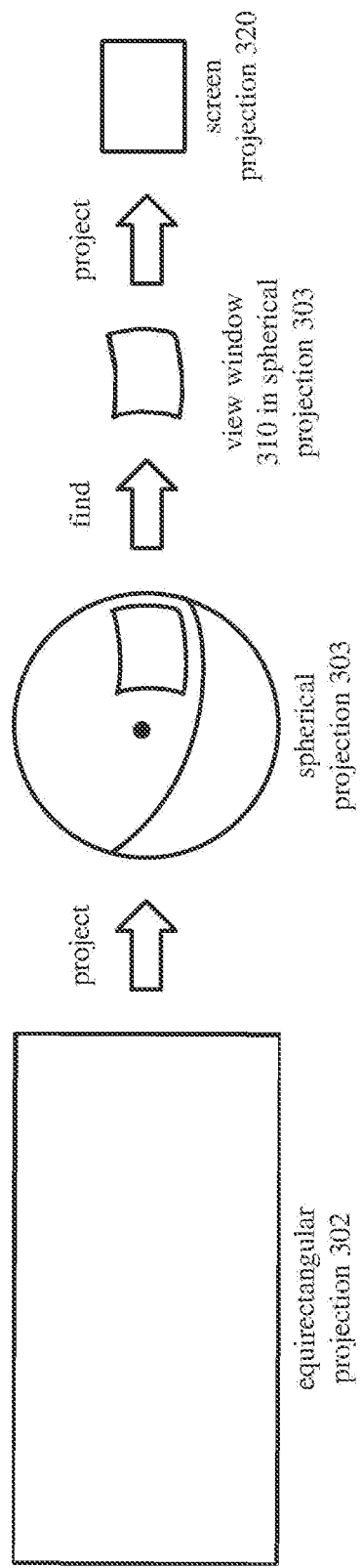
FIG. 3e is a diagram illustrating an example of a screen projection for a view of a picture of panoramic video.

The detailed description presents innovations in stream configuration operations and playback operations for adaptive streaming of panoramic video. The innovations include features of adaptive streaming of panoramic video with composite pictures. In some example implementations, the innovations can help avoid disruption in playback of panoramic video if a viewer dramatically changes view direction or zoom factor during playback, or if encoded data for a section of panoramic video is lost (e.g., due to network congestion) or corrupted. The innovations also include features of adaptive streaming of panoramic video with overlapping sections. In other example implementations, the innovations can help avoid disruption in playback of panoramic video as a viewer gradually changes view direction or zoom factor during playback.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems

FIG. 1 illustrates a generalized example of a suitable computer system (100) in which several of the described innovations may be implemented. The innovations described herein relate to panoramic video stream configuration, streaming, and playback. Aside from its use in panoramic video stream configuration, streaming, and/or playback, the computer system (100) is not intended to suggest any limitation as to scope of use or functionality, as the innovations may be implemented in diverse computer systems, including special-purpose computer systems adapted for panoramic video stream configuration, streaming, and/or playback.

With reference to FIG. 1, the computer system (100) includes one or more processing cores (110 . . . 11x) of a central processing unit ("CPU") and local, on-chip memory (118). The processing core(s) (110 . . . 11x) execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing tools for adaptive panoramic video stream configuration, streaming, and/or playback, using overlapping sections and/or composite pictures, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) can include processing cores (not shown) and local memory (not shown) of a graphics processing unit ("GPU"). In general, a GPU is any specialized circuit, different from the CPU, that accelerates creation and/or manipulation of image data in a graphics pipeline. The GPU can be implemented as part of a dedicated graphics card (video card), as part of a motherboard, as part of a system on a chip ("SoC"), or in some other way (even on the same die as the CPU). The number of processing cores of the GPU depends on implementation. The processing cores of the GPU are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The local memory may be volatile memory (e.g., registers, cache, RAM), non-volatile memory (e.g., ROM, EEPROM, flash memory, etc.), or some combination of the two, accessible by the respective processing cores of the GPU. The processing core(s) of the GPU can execute computer-executable instructions for one or more innovations for adaptive panoramic video stream configuration, streaming, and/or playback.

Alternatively, the computer system (100) includes one or more processing cores (not shown) of a system-on-a-chip ("SoC"), application-specific integrated circuit ("ASIC") or other integrated circuit, along with associated memory (not shown). The processing core(s) can execute computer-executable instructions for one or more innovations for adaptive panoramic video stream configuration, streaming, and/or playback.

The computer system (100) includes shared memory (120), which may be volatile memory (e.g., RAM), non-volatile memory (e.g., ROM, EEPROM, flash memory, etc.), or some combination of the two, accessible by the processing core(s). Depending on architecture (e.g., whether a GPU is part of a video card, motherboard, or SoC), CPU memory can be completely separate from GPU memory, or CPU memory and GPU memory can, at least in part, be shared memory or drawn from the same source (e.g., RAM). The memory (120) stores software (180) implementing tools for adaptive panoramic video stream configuration, streaming, and/or playback, using overlapping sections and/or composite pictures, for operations performed, in the form of computer-executable instructions. In FIG. 1, the shared memory (120) is off-chip memory, for which access operations, transfer operations, etc. with the processing cores are slower.

The computer system (100) includes one or more network adapters (140). As used herein, the term network adapter indicates any network interface card ("NIC"), network interface, network interface controller, or network interface device. The network adapter(s) (140) enable communication over a network to another computing entity (e.g., server, other computer system). The network can be a wide area network, local area network, storage area network or other network. The network adapter(s) (140) can support wired connections and/or wireless connections, for a wide area network, local area network, storage area network or other network. The network adapter(s) (140) convey data (such as computer-executable instructions, audio or video input or output, or other data) in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The computer system (100) can also include an audio input, a motion sensor/tracker input, and/or a game controller input.

The computer system (100) includes one or more output devices (160). The output device(s) (160) may be a printer, CD-writer, or another device that provides output from the computer system (100). For video playback, the output device(s) (160) may be a head-mounted display, computer monitor, or other display device. An audio output can provide audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing tools for adaptive panoramic video stream configuration, streaming, and/or playback, using overlapping sections and/or composite pictures.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The innovations can be described in the general context of computer-readable media. Computer-readable media are any available tangible media that can be accessed within a computing environment. By way of example, and not limitation, with the computer system (100), computer-readable media include memory (118, 120), storage (170), and combinations thereof. The term computer-readable media does not encompass transitory propagating signals or carrier waves.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

In general, a computer system or device can be local or distributed, and can include any combination of special-purpose hardware and/or hardware with software implementing the functionality described herein. For the sake of presentation, the detailed description uses terms like "determine," "receive" and "provide" to describe computer operations in a computer system. These terms denote operations performed by a computer and should not be confused with acts performed by a human being. The actual computer operations corresponding to these terms vary depending on implementation.

II. Example Network Environments

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both one or more encoders (220) and one or more decoders (270) for bidirectional communication. Each RTC tool (210) is an example of a panoramic video stream configuration tool and a panoramic video playback tool. A given encoder (220) can produce output compliant with the H.265/HEVC standard, ISO/IEC 14496-10 standard (also known as H.264/AVC), another standard, or a proprietary format such as VP8 or VP9, or a variation or extension thereof, with a corresponding decoder (270) accepting and decoding encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 4:
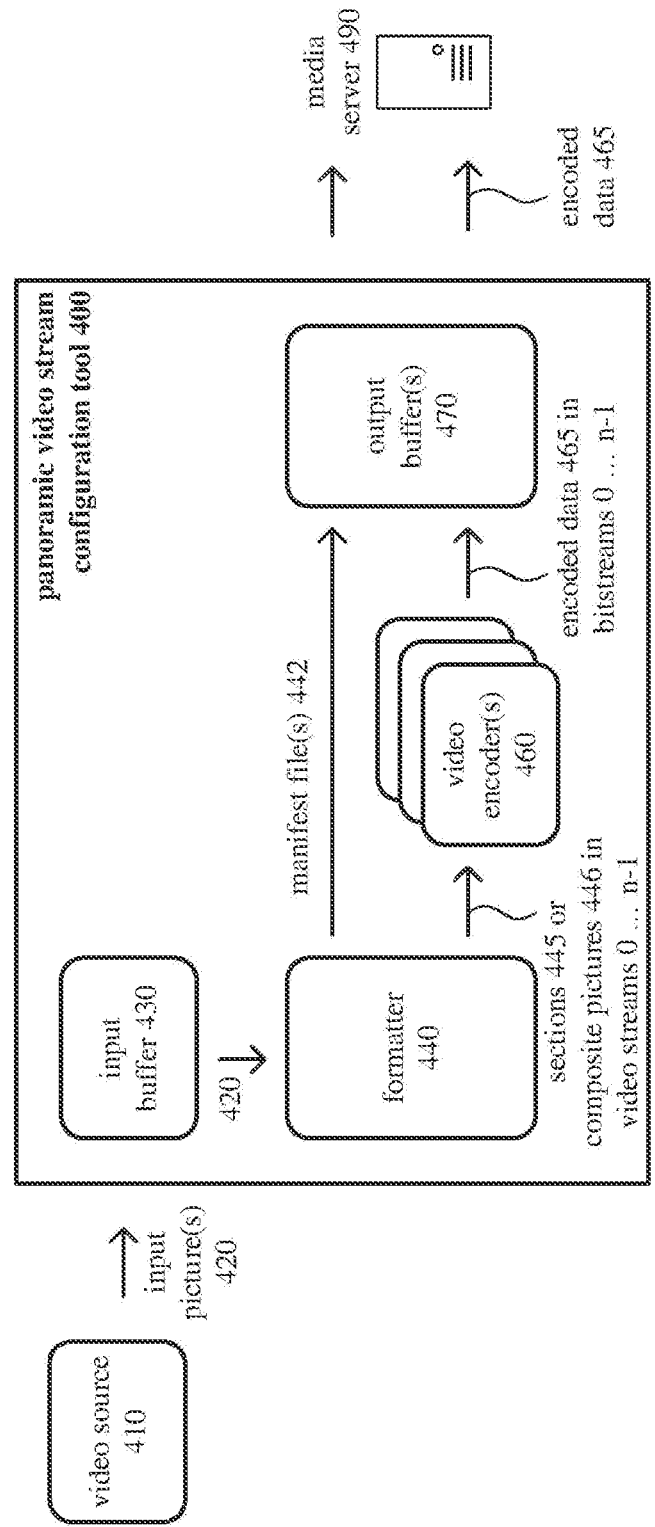
FIG. 4 is a diagram illustrating an example architecture for a panoramic video stream configuration tool that supports overlapping sections and composite pictures.
Figure 5:
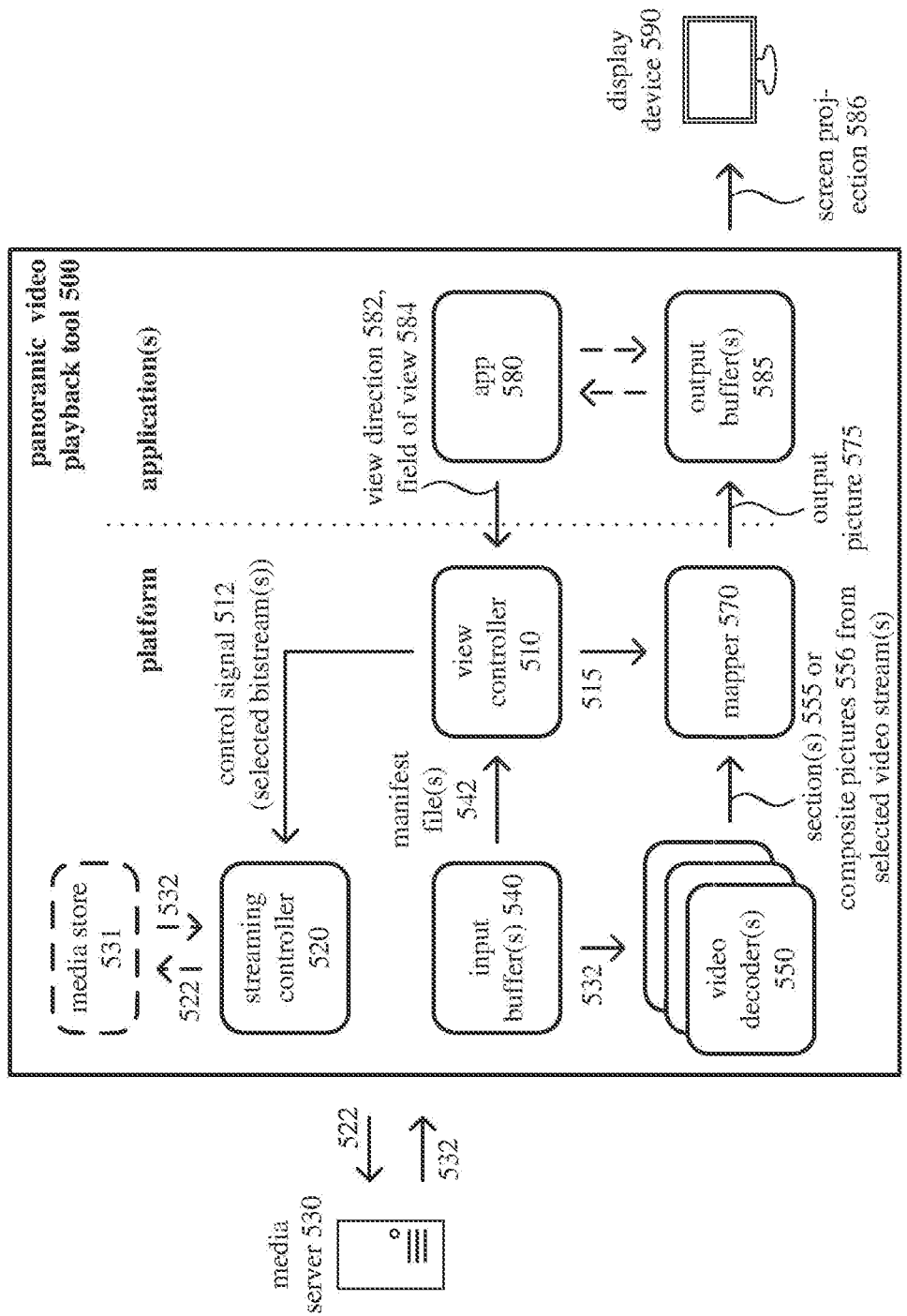
FIG. 5 is a diagram illustrating an example architecture for a panoramic video playback tool that supports overlapping sections and composite pictures.

An RTC tool (210), as a panoramic video stream configuration tool, manages encoding by the encoder(s) (220) and also, as a panoramic video playback tool, manages decoding by the decoder(s) (270). FIG. 4 shows an example panoramic video stream configuration tool (400) that can be implemented in the RTC tool (210). FIG. 5 shows an example panoramic video playback tool (500) that can be implemented in the RTC tool (210). Alternatively, the RTC tool (210) uses another panoramic video stream configuration tool and/or another panoramic video playback tool.

In the network environment (202) shown in FIG. 2b, a panoramic video stream configuration tool (212) includes one or more encoders (220) that encode video for delivery to multiple panoramic video playback tools (214), which include decoders (270). The unidirectional communication can be provided for live broadcast video streaming, a video surveillance system, web camera monitoring system, remote desktop conferencing presentation or sharing, wireless screen casting, cloud computing or gaming, or other scenario in which panoramic video is encoded and sent from one location to one or more other locations. Although the network environment (202) in FIG. 2b includes two playback tools (214), the network environment (202) can include more or fewer playback tools (214). In general, a playback tool (214) communicates with the stream configuration tool (212) to determine one or more streams of video for the playback tool (214) to receive. The playback tool (214) receives the stream(s), buffers the received encoded data for an appropriate period, and begins decoding and playback.

The stream configuration tool (212) can include server-side controller logic for managing connections with one or more playback tools (214). A playback tool (214) can include client-side controller logic for managing connections with the stream configuration tool (212). FIG. 4 shows an example panoramic video stream configuration tool (400) that can be implemented in the stream configuration tool (212). Alternatively, the stream configuration tool (212) uses another panoramic video stream configuration tool. FIG. 5 shows an example panoramic video playback tool (500) that can be implemented in the playback tool (214). Alternatively, the playback tool (214) uses another panoramic video playback tool.

Alternatively, a Web server or other media server can store encoded video for delivery to one or more panoramic video playback tools (214), which include decoders (270). The encoded video can be provided, for example, for on-demand video streaming, broadcast, or another scenario in which encoded video is sent from one location to one or more other locations. A playback tool (214) can communicate with the media server to determine one or more streams of video for the playback tool (214) to receive. The media server can include server-side controller logic for managing connections with one or more playback tools (214). A playback tool (214) receives the stream(s), buffers the received encoded data for an appropriate period, and begins decoding and playback.

III. Example Projections for a Picture of Panoramic Video

Panoramic video (sometimes called 360-degree video, immersive video, or spherical video) is video in which views in multiple directions around a central position are recorded at the same time. A picture of panoramic video is a representation of the views in multiple directions recorded at a given time. The picture of panoramic video can include image content in every direction or substantially every direction from the central position. More commonly, a picture of panoramic video includes image content in every direction in a 360-degree circle around the central position, including at least some image content above the central position and at least some image content underneath the central view/camera position.

A picture of panoramic video includes sample values, which represent colors at locations of the picture. Depending on how the picture is projected, sample values of the picture can have various attributes. In general, sample values can have 8 bits per sample value, 10 bits per sample value, 12 bits per sample value, or some other number of bits per sample value. The dynamic range of sample values can be standard dynamic range (e.g., 0 to 100 nits), high dynamic range (e.g., 0 nits to 1000 nits, 0 nits to 1500 nits, 0 nits to 4000 nits), or some other dynamic range. With respect to color gamut, the sample values can have a narrow color gamut (common for standard dynamic range video) or a wider color gamut (common for high dynamic range video), which can potentially represent colors that are more saturated, or vivid. For a rectilinear projection, the spatial resolution of a picture of panoramic video can be 1280×720 sample values (so-called 720p), 1920×1080 sample values (so-called 1080p), 2160×1080 sample values, 3840×2160 (so-called 4K), 4320×2160 sample values, 7680×3840 sample values, 7680×4320 sample values (so-called 8K), 8640×4320 sample values, or some other number of sample values per picture. Often, the spatial resolution of a picture of panoramic video is very high (e.g., 8K or higher), so as to provide sufficient spatial resolution when a smaller view within the picture is rendered. In general, a pixel is the set of one or more collocated sample values for a location in a picture, which may be arranged in different ways for different chroma sampling formats. For a spherical projection, spatial resolution can vary.

Typically, before encoding in a rectilinear projection (e.g., an equirectangular projection), sample values of a picture are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). After decoding, sample values in a rectilinear projection may be converted to another color space, such as an RGB color space. Sample values in a spherical projection or screen projection for a picture of panoramic video may be in an RGB color space or other color space.

The image content for a picture of panoramic video can be organized in various ways. FIG. 3a shows a spherical projection (301) for a picture of panoramic video. In the spherical projection (301), sample values are mapped to locations equally distant from a central view/camera position. Sample values may be in an RGB color space or other color space close to the final color space for rendering. The spherical projection (301) provides a conceptually simple way to represent the sample values of the picture of panoramic video, and may be useful for some modeling and rendering operations. For other stages of processing (e.g., storage, compression, decompression), however, the spherical projection (301) may not be as efficient as other types of projections.

FIG. 3b shows an equirectangular projection (302) for a picture of panoramic video. The equirectangular projection (302) is a useful representation for storing, compressing, and decompressing sample values of the picture of panoramic video. In particular, sample values of the equirectangular projection (302) can be processed with conventional video coding/decoding tools, which process blocks of sample values in rectangular pictures. The equirectangular projection (302) depicts image content in 360 degrees, rotating sideways from a central view/camera position, along the horizontal axis that bisects the equirectangular projection (302); it depicts image content in 180 degrees, rotating up or down from a central view/camera position, along the vertical axis. In the equirectangular projection (302), content towards the top of the picture and content towards the bottom of the picture is stretched horizontally, and content midway between the top and bottom is squeezed horizontally. In addition to causing visible distortion (which is not a problem to the extent the equirectangular projection (302) is not directly rendered for display), the equirectangular projection (302) uses extra sample values to represent the content towards the top of the picture and content towards the bottom of the picture, which can decrease compression efficiency. Metadata associated with the equirectangular projection (302) can indicate resolution of the equirectangular projection (302) as well as a view direction at each of one or more locations of the equirectangular projection (302) (e.g., view direction at the center of the equirectangular projection (302), view direction at the midpoint of the vertical axis along an edge of the equirectangular projection (302)). Or, a default view direction for a location of the equirectangular projection (302) can be defined. For example, the center of the equirectangular projection (302) is defined to be the view direction with pan of zero degrees and pitch of zero degrees.

FIG. 3c shows a sinusoidal projection (303) for a picture of panoramic video. The sinusoidal projection (303) is another useful representation for storing, compressing, and decompressing sample values of the picture of panoramic video. A sinusoidal projection is a pseudo-cylindrical, equal-area map projection, in which scale is constant along a central meridian (or multiple central meridians), and horizontal scale is constant throughout the map. A sinusoidal projection can have a single fold (single central meridian) or multiple folds (multiple central meridians). For example, a bi-fold sinusoidal projection can have two central meridians of equal length, with the two folds corresponding to hemispheres of the map. Thus, the sinusoidal projection (303) depicts image content in 360 degrees, rotating sideways from a central view/camera position, along the horizontal axis that bisects the sinusoidal projection (303); it depicts image content in 180 degrees, rotating up or down from a central view/camera position, along the vertical axis. Unlike the equirectangular projection (302), in the sinusoidal projection (303), content towards the top of the picture and content towards the bottom of the picture is not stretched horizontally, and content midway between the top and bottom is not squeezed horizontally. The sinusoidal projection (303) uses extra sample values having default values (e.g., black, gray) to represent areas outside the actual content, towards the top or bottom of the picture. Although this approach results in some sample values not being used to represent actual coded panoramic video, compression efficiency still tends to be better than with the equirectangular projection (302). Metadata associated with the sinusoidal projection (303) can indicate resolution of the sinusoidal projection (303) as well as a view direction at each of one or more locations of the sinusoidal projection (303) (e.g., view direction at the center of the sinusoidal projection (303), view direction at the midpoint of the vertical axis along an edge of the sinusoidal projection (303)). Or, a default view direction for a location of the sinusoidal projection (303) can be defined. For example, the center of the sinusoidal projection (303) is defined to be the view direction with pan of zero degrees and pitch of zero degrees.

FIG. 3d shows a cubemap projection (304) for a picture of panoramic video. Like the equirectangular projection (302) and sinusoidal projection (303), the cubemap projection (304) is a useful representation for storing, compressing, and decompressing sample values of the picture of panoramic video, because the faces of the cubemap projection (304) can be "unfolded" and/or split into separate sections for such operations. In the cubemap projection (304), content towards the edges of faces of a cube is stretched horizontally and/or vertically, and content towards the middle of faces is squeezed horizontally and/or vertically. In general, the extent of such stretching is less than at the top and bottom of the equirectangular projection (302), and the cubemap projection (304) may use fewer extra sample values to represent stretched content. Metadata associated with the cubemap projection (304) can indicate resolution of the cubemap projection (304) as well as a view direction at each of one or more locations of the cubemap projection (304). Or, default view directions for locations of the cubemap projection (304) can be defined.

During playback, pictures of panoramic video are reconstructed. At least conceptually, a picture may be represented in spherical projection at this stage. Typically, a viewer can control a view direction relative to the central view/camera position for the spherical projection, potentially changing which section of the panoramic video is viewed. For example, in addition to specifying heading in degrees or radians from side to side (i.e., yaw, or pan) for a view direction, the viewer can specify an inclination in degrees or radians up or down (i.e., pitch, or tilt) for the view direction and even a rotation in degrees or radians of the view (i.e., roll) for the view direction. Alternatively, the view direction can be parameterized in some other way (e.g., as a matrix of affine transform coefficients that specify a spatial rotation in three dimensions using Euler angles or quaternion units, corresponding to heading, pitch, and roll values). The viewer may also be able to zoom in or zoom out. A field of view can be specified in degrees (e.g., 90 degrees for normal view, 120 degrees for wide view) or radians. When a view of panoramic video is rendered for display, the section of the panoramic video that is viewed may be projected to a flat image, which is called a screen projection.

FIG. 3e shows an example of screen projection for a view of a picture of panoramic video. An equirectangular projection (302) of the picture is reconstructed, e.g., through video decoding operations and color conversion operations. The sample values of the picture of panoramic video are mapped to the spherical projection (303). In essence, the sample values are projected to the "inside" of the sphere for the spherical projection (303), as viewed from the perspective of a view/camera position at the center of the sphere. Locations in the spherical projection (303) are mapped to corresponding locations in the equirectangular projection (302). If a corresponding location in the equirectangular projection (302) is at or near an integer (whole pixel) offset, the sample value from the corresponding location is assigned to the location in the spherical projection (303). Otherwise, a sample value can be calculated by interpolation between sample values at nearby locations in the equirectangular projection (302) (e.g., using bilinear interpolation), and the (interpolated) sample value is assigned to the location in the spherical projection (303).

A view window (310) in the spherical projection (303) is found, based on a view direction, zoom factor, and field of view from the central view/camera position. The view window (310) is projected to a screen projection (320) for rendering. For example, a perspective transform is applied to assign sample values to the respective locations of the screen projection (320) from the sample values of the spherical projection (303). For every location of the screen projection (320), a sample value is assigned directly from the spherical projection (303) or from interpolation between sample values of the spherical projection (303). Thus, the screen projection (320) includes sample values from the spherical projection (303) and, by extension, sample values from relevant parts of the equirectangular projection (302).

IV. Examples of Identifying Sections of Pictures in Input Projections

When an application provides a view direction, field of view (if not pre-defined), and zoom factor (if configurable) for rendering a view of a picture of panoramic video, the application specifies a view window to be rendered. For example, an application provides an indication of view direction to a module of a panoramic video playback tool. The view direction can be specified as (1) a heading in degrees or radians from side to side (i.e., yaw, or pan) from a central view/camera position and (2) an inclination in degrees or radians up or down (i.e., pitch, or tilt) from the view/camera position. The view direction can also include (3) a rotation in degrees or radians of the view (i.e., roll) from the view/camera position. Alternatively, the view direction can be parameterized in some other way (e.g., as a matrix of affine transform coefficients that specify a spatial rotation in three dimensions using Euler angles or quaternion units, which correspond to heading, pitch, and roll values). The field of view can be specified in degrees (e.g., 90 degrees for normal view, 120 degrees for wide view) or radians. A zoom factor can be specified as a distance from a view camera position, size of view window, or in some other way. Alternatively, instead of directly providing indications of view direction (and possibly field of view and zoom factor), an application can specify a source for indications of view direction (and possibly field of view and zoom factor), in which case the specified source provides the indications during rendering. In any case, the module of the panoramic video playback tool finds the appropriate view window for a spherical projection of the picture of panoramic video.

The view window typically includes a small proportion of the overall content of a picture of panoramic video. To simplify processing and save resources during operations such as retrieval and decoding of encoded data, a panoramic video playback tool can identify one or more sections of an input picture, in an input projection (such as an equirectangular projection, cubemap projection, sinusoidal projection, or other projection), that contain the view window, then use that information to limit which operations are performed when reconstructing the picture of panoramic video. In particular, the panoramic video playback tool can limit operations to the identified section(s) of the picture in the input projection.

For example, a panoramic video playback tool finds a view window of a spherical projection based on a view direction (and field of view and zoom factor, which may be pre-defined). Based on the view window, the playback tool identifies one or more sections of an input picture (in an input projection such as an equirectangular projection, cubemap projection, or sinusoidal projection) that contain the view window of the spherical projection. Given a view window of the spherical projection, the playback tool can project from the spherical projection back to the input projection to identify a corresponding window in the input picture of panoramic video, then identify those sections in the input picture that include any part of the corresponding window. The corresponding window in the input picture can have an irregular boundary and be split (e.g., across an edge). In this way, the playback tool can identify any section of the picture that contains at least part of the view window.

Typically, the identified section(s) are aligned with boundaries of groups of sample values (e.g., blocks, slices, tiles) for different operations in the reconstruction process. Depending on the position and size of the view window, one section of the picture may include the entire view window. Or, multiple sections of the picture may collectively include the view window. The multiple sections can be contiguous or, if the view window crosses an edge of the picture, be non-contiguous. The playback tool can limit operations (such as retrieval of encoded data, decoding of encoded data, and creation of output pictures) to the identified section(s).

V. Example Architectures for Adaptive Streaming of Panoramic Video

When a panoramic video stream configuration tool receives input pictures of panoramic video, the stream configuration tool produces encoded data for the panoramic video in multiple bitstreams. When a panoramic video playback tool receives encoded data for panoramic video, the playback tool renders views of the panoramic video. This section describes various aspects of example architectures for stream configuration and example architectures for playback of panoramic video, including use of overlapping sections and composite pictures.

Panoramic video can be produced and streamed for various use case scenarios. For example, panoramic video can be produced and streamed for a live event such as a concert or sporting event. Or, as another example, panoramic video can be produced and streamed for an immersive experience for education, virtual travel, or a virtual walk-through for a real estate listing. Or, as another example, panoramic video can be produced and streamed for conferencing or telemedicine. Or, as another example, panoramic video can be produced and streamed for immersive gameplay broadcasting.

Panoramic video can be played back in various ways. For example, panoramic video can be played back through a Web browser or video playback application, executing on a game console, desktop computer, or other computing platform. Or, as another example, panoramic video can be played back through a mobile device or head-mounted display for a VR or AR application.

In some configurations, a single entity manages end-to-end behavior of a panoramic video stream configuration tool and one or more panoramic video playback tools. In such configurations, the stream configuration tool and playback tool(s) can exchange information about partitioning of input pictures into sections, organization of composite pictures, stream selection decisions, etc. in one or more private channels. In alternative configurations, the panoramic video stream configuration tool and panoramic video playback tool(s) are managed by different entities. In such configurations, the stream configuration tool and playback tool(s) can interoperate across standardized interfaces, according to defined protocols, to exchange information about partitioning of input pictures into sections, organization of composite pictures, stream selection decisions, etc.

A. Example Stream Configuration Architectures

FIG. 4 shows an example architecture for a panoramic video stream configuration tool (400) that supports overlapping sections and composite pictures. In addition to a video source (410) and a media server (490), the example architecture includes a panoramic video stream configuration tool (400) with an input buffer (430), a formatter (440), one or more video encoders (460), and one or more output buffers (470).

The video source (410) provides input pictures (420) of panoramic video to the input buffer (430). For example, the video source (410) includes a buffer associated with an omnidirectional camera, which produces input pictures (420) of panoramic video. Alternatively, the video source (410) includes buffers associated with a collection of cameras, which produce pictures taken in different directions at a location, and a buffer that stores input pictures (420) of panoramic video aggregated, mosaicked, composited, etc. from the pictures produced by the cameras. The cameras can be physical cameras that record natural video or virtual cameras that record video in a synthetic environment (e.g., game environment). Alternatively, the stream configuration tool (400) can itself create the input pictures (420) of panoramic video, which are stored in the input buffer (430), from pictures of streams that the stream configuration tool (400) receives. The panoramic video stream configuration tool (400) can implemented at a content production site, co-located with the video source (410) or cameras. Alternatively, the panoramic video stream configuration tool (400) can be implemented at a remote site (e.g., Web server), with the video source (410) providing input pictures (420) of panoramic video to the configuration tool (400) over a network, or cameras providing streams of video to the configuration tool (400) over a network.

The input buffer (430) is configured to receive and store one or more input pictures (420) of panoramic video. Typically, an input picture (420) is in an input projection. For example, the input projection can be an equirectangular projection, cubemap projection, sinusoidal projection, or other type of projection. In some example implementations, an input picture (420) has a spatial resolution of 4K or higher. Alternatively, an input picture (420) can have a lower spatial resolution.

The formatter (440) is configured to split each input picture (420) into multiple sections (445) (n sections) according to partition settings. The value of n depends on implementation. For example, n is 6, 8, 12, or 16. A data store (not shown) can store various settings for the panoramic video stream configuration tool (400). For example, the settings can include partition settings used to split input pictures (420) of panoramic video into sections (445). The partition settings can include the count n of sections (445) into which input pictures (420) are partitioned, the relative sizes and positions of the sections (445), and (for overlapping sections) the extent of overlap between sections (445). The spatial resolution of the sections (445) depends on implementation. In some example implementations, the sections (445) each have a spatial resolution of 1080p, 720p, or some other resolution that is readily accepted by the video encoder(s) (460) and large enough to contain the content for a typical view window in playback, but small enough to exclude content of the panoramic video outside of a typical view window (to avoid unnecessary retrieval and reconstruction of content during playback).

In some configurations, the n sections (445) are non-overlapping. In other configurations, the n sections (445) are overlapping. That is, each of the n sections (445) overlaps at least one other section among the n sections (445). In some example implementations, each of the n sections (445) overlaps each adjacent section among the n sections. The overlapping of the sections (445) tends to decrease overall compression efficiency (because the same sample values may be redundantly encoded in different sections). On the other hand, the overlapping of the sections (445) tends to reduce the incidence of disruption of playback caused by bitstream switching. The formatter (440) is configured to add the n sections (445) to corresponding video streams. In FIG. 4, there are n streams for the n sections (445), which are labeled 0 . . . n−1.

The formatter (440) can be configured to project the input picture (420) from an input projection to an intermediate projection, such that the n sections (445) are in the intermediate projection. For example, the input projection is an equirectangular projection or a cubemap projection, and the intermediate projection is a sinusoidal projection. In this case, at least one of the n sections (445) includes at least some sample values having default values, not representing content of the input picture of panoramic video.

The formatter (440) can be configured to receive an indication of feedback and, based at least in part on the indication of feedback, adjust the partition settings. For example, the indication of feedback includes an indication of network connection quality, an indication of magnitude of view window change activity, an indication of which view direction is prevalent, and/or some other type of feedback. To adjust the partition settings, the formatter (440) can be configured to change an extent of overlap between overlapping sections, change a count of the n sections (445), change relative sizes of at least some of the n sections (445), change positions of at least some of the n sections (445), add one or more sections, at new positions, to the n sections (445), remove one or more sections from the n sections (445), and/or make some other change to the partition settings.

In some configurations, the formatter (440) is configured to create a low-resolution version of the input picture (420). For example, the formatter (440) downsamples the input picture (420) horizontally and/or vertically. The low-resolution version of the input picture (420) can have a width the same as one of the n sections (e.g., 1920 sample values for a 1080p section, 1280 sample values for a 720p section). The height of the input picture (420) can be reduced proportionally. The formatter (440) is further configured to, after splitting the input picture (420) into n sections (445) (which can be overlapping or non-overlapping, depending on implementation) according to partition settings, create n composite pictures (446). Each of the n composite pictures (446) includes one of the n sections (445) and also includes the low-resolution version of the input picture (420). The formatter (440) is configured to add the n composite pictures (446), including the n sections (445), respectively, to corresponding video streams.

A composite picture (446) can be organized in various ways. For example, for each of the n composite pictures (446), the low-resolution version of the input picture (420) is adjacent one of the n sections (445) within the composite picture (446). Or, as another example, for each of the n composite pictures (446), one of the n sections (445) provides a first view of a frame packing arrangement, and the low-resolution version of the input picture (420) provides a second view of the frame packing arrangement. Within a composite picture (446), the low-resolution version of the input picture (420) can be positioned at a pre-defined location relative to one of the n sections (445). Alternatively, within a composite picture (446), the low-resolution version of the input picture (420) can be positioned at a variable location relative to one of the n sections (445).

The input picture (420) and the low-resolution version of the input picture (420) can be in an input projection, such as an equirectangular projection or a cubemap projection. The formatter (440) can be further configured to project the input picture (420) from the input projection to an intermediate projection, such as a sinusoidal projection. In a composite picture (446), the low-resolution version of the input picture (420) can be in the input projection or the intermediate projection.

The video encoder(s) (460) are configured to encode sample values of the n sections (445) or n composite pictures (446) in the corresponding video streams, respectively. The sample values are, for example, 8-bit sample values or 10-bit sample values in a YUV color space, with a chroma sampling rate of 4:2:0. Alternatively, the sample values encoded by the video encoder(s) (460) are in another format. The encoding produces encoded data (465) for the n sections (445) or n composite pictures (446) as part of n bitstreams for the corresponding video streams, respectively. For example, the n bitstreams are video elementary bitstreams. Depending on implementation and the format of the encoded data, the video encoder(s) (460) can produce encoded data conformant to the H.265/HEVC standard, ISO/IEC 14496-10 standard (also known as H.264/AVC), another standard, or a proprietary format such as VP8 or VP9, or a variation or extension thereof. The stream configuration tool (400) can include a multiplexer (not shown) configured to combine the encoded data, for the n bitstreams, into a single container stream.

The formatter (440) is further configured to produce one or more manifest files (442). The manifest file(s) (442) include information indicating, for each of the n bitstreams, the position (e.g., in coordinates of the input picture (420), or in coordinates of a spherical projection) of one of the n sections (445) whose content is part of the corresponding video stream for that bitstream. The manifest file(s) (442) can also include information that indicates where the low-resolution version of the input picture (420) is positioned in the n composite pictures (446), respectively.

The output buffer(s) (470) are configured to store the encoded data (465) for delivery to the media server (490). The output buffer(s) can also store the manifest file(s) (442) for delivery to the media server (490). The media server (490) can be a Web server or other server, connected over a network, that stores encoded data (465) for the n streams of sections (or composite pictures) of the panoramic video and streams the encoded data (465) for selected bitstreams to playback tools for playback.

Depending on implementation and the type of processing desired, modules of the panoramic video stream configuration tool (400) can be added, omitted, split into multiple modules, combined with other modules, and/or replaced with like modules. In alternative embodiments, panoramic video stream configuration tools with different modules and/or other configurations of modules perform one or more of the described techniques. Specific embodiments of panoramic video stream configuration tools typically use a variation or supplemented version of the panoramic video stream configuration tool (400). The relationships shown between modules within the panoramic video stream configuration tool (400) indicate general flows of information in the panoramic video stream configuration tool (400); other relationships are not shown for the sake of simplicity.

In general, a given module of the panoramic video stream configuration tool (400) can be implemented by software executable on a CPU, by software controlling special-purpose hardware (e.g., a GPU or other graphics hardware for video acceleration), or by special-purpose hardware (e.g., in an ASIC). In particular, in some example implementations, video encoding operations and re-projection operations to map sample values between different projections are implemented with shader instructions executable on a GPU. Thus, computationally-intensive, repetitive operations (e.g., for video encoding, for mapping between different types of projections when splitting input pictures into sections) are likely to be implemented with graphics hardware (e.g., as shader instructions for a GPU) or other special-purpose hardware, and higher-level operations (e.g., deciding how to partition input pictures) are likely to be implemented in software executable on a CPU.

B. Example Playback Architectures

FIG. 5 shows an example architecture for a panoramic video playback tool (500) that supports overlapping sections and composite pictures. In addition to a media server (530), application (580), and display device (590), the example architecture includes a panoramic video playback tool (500) with a view controller (510), a streaming controller (520), one or more input buffers (540), one or more video decoders (550), a mapper (570), and one or more output buffers (585).

The application (580) can be provided by a third party or packaged as part of the panoramic video playback tool (500). The application (580) can separated from other modules of the panoramic video playback tool (500) (system-provided modules) by an application programming interface ("API").

A data store (not shown) can store various settings for the panoramic video playback tool (500). For example, the settings can include information provided by the application (580) when the application (580) is installed. Other modules can interact with the data store across an interface.

The view controller (510) is configured to determine a view window for playback of panoramic video. For example, the view window depends on a view direction. The view controller (510) is configured to receive an indication of a view direction (582) for the application (580). In FIG. 5, the application (580) provides the indication of the view direction (582). Instead of the application (580), another source (e.g., a source based on one or more sensors such as one or more accelerometers, gyroscopes, tilt sensors, optical sensors, cameras, etc., or a source of user input events for key presses, mouse cursor movements, mouse scroll wheel movements, remote control input, game controller input, touch screen input, etc.) can provide the indication of the view direction (582). For example, the view direction (582) is parameterized as described in section IV. The view window can also depend on a field of view and/or zoom factor. In some configurations, the view controller (510) is also configured to receive an indication of a field of view (584) for the application (580), from the application (580) or another source. For example, the field of view (584) is parameterized as described in section IV. The field of view (584) can be defined for the application (580) or for a playback session. In some configurations, the view controller (510) is also configured to receive an indication of a zoom factor for the application (580), from the application (580) or another source. For example, the zoom factor is parameterized as described in section IV. Typically, the zoom factor can change dynamically (e.g., to zoom in or zoom out) during a playback session.

The view controller (510) is configured to receive one or more manifest files (542) and use the manifest file(s) (542) to identify one or more sections that contain at least part of the view window and/or select one or more bitstreams for the identified section(s). The manifest file(s) (542) are provided from an input buffer (540), which can receive the manifest file(s) (542) from the media server (530) or directly from a stream configuration tool. The manifest file(s) (542) include information indicating, for each of n bitstreams, the position (e.g., in coordinates of the input picture (420), or in coordinates of a spherical projection) of one of n sections whose content is part of the corresponding video stream. The manifest file(s) (542) can also include information that indicates where the low-resolution version of an input picture is positioned in composite pictures (556), respectively.

The view controller (510) is also configured to, from among multiple sections (n sections) of the panoramic video, identify one or more sections that contain at least part of the view window. For example, the view controller (510) is configured to identify each of the n sections that contains at least part of the view window. The view controller (510) can identify the section(s) that each contain at least part of the view window as described in section IV. Or, the view controller (510) can simply use position information (e.g., coordinates of a spherical projection) in the manifest file(s) (542) to identify the section(s) that each contain at least part of the view window. The identified section(s) can be contiguous sections for an input picture in an input projection (e.g., equirectangular projection, cubemap projection, sinusoidal projection). Or, the identified section(s) can be non-contiguous sections that wrap around one or more edges of an input picture in an input projection. The view controller (510) is further configured to, for the identified section(s), select one or more bitstreams among n bitstreams for corresponding video streams. The view controller (510) is configured to pass a control signal (512) to the streaming controller (520) that indicates the selected bitstream(s). In this way, the view controller (510) can iteratively perform operations to determine the view window, identify the section(s) that contain at least part of the view window, and select the bitstream(s) for the identified section(s).

In some configurations, the n sections are non-overlapping. In other configurations, the n sections are overlapping. That is, each of the n sections overlaps at least one other section among the n sections. In some example implementations, each of the n sections overlaps each adjacent section among the n sections. The overlapping of the n sections tends to decrease overall compression efficiency (because the same sample values may be redundantly encoded in different sections). On the other hand, the overlapping of the n sections also tends to reduce the incidence of playback disruption attributable to bitstream switching. In particular, when there is gradual panning motion out of a section or zooming to a new section, the overlapping of the n sections gives a way to render high-resolution views quickly and without playback disruption. Although the playback tool (500) can switch to a new bitstream for a new section, stream switching can take time (e.g., to send the request for the new bitstream to the media server (530), and to wait for a switch point at which decoding can begin in the new bitstream). For example, stream switching can take 3-5 seconds. With overlapping sections, if the view direction and/or zoom factor changes, the view controller (510) can identify new sections/streams that are to be used to create an output picture (575) for the view window sooner. Because of overlap between adjacent sections, for changes in view direction and/or zoom factor that are gradual and consistent, the view controller (510) in effect pre-fetches a new section as the view window moves out of a current section into the new section. By the time the view window reaches a non-overlapping part of the adjacent, new section, content for the adjacent, new section has already been retrieved and reconstructed, assuming the motion of the view window is not extreme. This hides network latency and stream switching latency from the viewer, and disruption of playback is avoided.

The view controller (510) can be configured to send an indication of feedback (e.g., to a stream configuration tool or to an aggregator for feedback). The feedback can then be used to adjust the partition settings applied when splitting an input picture into sections. For example, the indication of feedback includes an indication of network connection quality, an indication of magnitude of view window change activity, an indication of which view direction is prevalent, and/or another type of feedback.

The view controller (510) is configured to provide an indication (515) of the identified section(s) to the mapper (570). The mapper (570) can use the indication (515) of the identified section(s), as well as the manifest file(s) (542), when creating an output picture (575) for the view window.

The streaming controller (520) is configured to request encoded data, in the selected bitstream(s) for the identified section(s), respectively, for an input picture of the panoramic video. Depending on configuration, the streaming controller (520) can send a request (522) for encoded data (532) to the media server (530), directly to a panoramic video stream configuration tool, or to a local media store (531). The streaming controller (520) can make separate requests (522) for encoded data (532) for different portions (e.g., slices, tiles) of an input picture or for each input picture, or it can batch requests.

The media server (530) can be a Web server or other server, connected over a network, that is configured to store encoded data (532) for the n bitstreams for sections of the panoramic video, and stream the encoded data (532) for selected ones of the n bitstreams to playback tools for playback. In the scenario shown in FIG. 5, the media server (530) streams encoded data (532) for one or more selected bitstreams, which correspond to the identified sections(s) that contain a view window for playback.

If a media server (530) is not used, the panoramic video playback tool (500) can retrieve encoded data (532) for the selected bitstream(s) from a media store (531). The media store (531) can be a magnetic disk, optical storage media, non-volatile memory, or other storage or memory, connected locally to the panoramic video playback tool (500), that is configured to store encoded data (532) for panoramic video, and provide it for playback.

In some configurations, each of the identified section(s) is part of a composite picture (556) that also includes a low-resolution version of the input picture. The low-resolution version typically results from downsampling the input picture horizontally and/or vertically. The low-resolution version of the input picture can have a width the same as one of then sections (e.g., 1920 sample values for a 1080p section, 1280 sample values for a 720p section), with the height of the input picture reduced proportionally.

A composite picture (556) can be organized in various ways. For example, for each of n composite pictures (556), the low-resolution version of the input picture is adjacent one of the n sections within the composite picture (556). Or, as another example, for each of n composite pictures (556), one of then sections (555) provides a first view of a frame packing arrangement, and the low-resolution version of the input picture provides a second view of the frame packing arrangement. Within a composite picture (556), the low-resolution version of the input picture can be positioned at a pre-defined location relative to one of the n sections (555). Alternatively, within a composite picture (556), the low-resolution version of the input picture can be positioned at a variable location relative to one of the n sections (555).

The input buffer(s) (540) are configured to store the encoded data (532) for the selected bitstream(s). One of the input buffer(s) can also store the manifest file(s) (542), which may be provided by the media server (530), local media store (531), or a stream configuration tool. The input buffer(s) (540) are configured to provide encoded data (532) for selected bitstreams(s) to the video decoder(s) (550).

The video decoder(s) (550) are configured to decode the encoded data (532) to reconstruct the identified section(s) for the input picture, producing sample values for one or more reconstructed sections (555) from the corresponding video streams. When the selected bitstream(s) include composite picture(s) (556), the video decoder(s) are also configured to decode the encoded data (532) for the low-resolution version of the input picture, producing sample values for the low-resolution version of the input picture. Depending on implementation and the format of the encoded data, the video decoder(s) (550) can decode the encoded data (532) in a manner consistent with the H.265/HEVC standard, ISO/IEC 14496-10 standard (also known as H.264/AVC), another standard, or a proprietary format such as VP8 or VP9, or a variation or extension thereof. The sample values are, for example, 8-bit sample values or 10-bit sample values in a YUV color space, with a chroma sampling rate of 4:2:0. Alternatively, the sample values output by the video decoder(s) (550) are in another format.

The mapper (570) is configured to, based at least in part on the reconstructed section(s) (555) and/or the reconstructed low-resolution version of the input picture from the composite picture(s) (556), create an output picture (575). For example, the mapper (570) is configured to use the indication (515) of the identified section(s), as well as the manifest file(s) (542), to determine which sample values of the reconstructed section(s) (555), respectively, to map to the output picture (575). The mapper (570) can be configured to determine which sample values of the output picture (575) cannot be determined using the reconstructed section(s) (555) and, for any sample value of the output picture (575) that cannot be determined using the reconstructed section(s) (555), determine that sample value of the output picture (575) using the reconstructed low-resolution version of the input picture. Thus, the output picture (575) can be created using only sample values of the reconstructed section(s) (555). Or, the output picture (575) can be created using only sample values of the reconstructed low-resolution version of the input picture. Or, at least part of the output picture (575) can be created using sample values of the reconstructed section(s) (555), and at least part of the output picture (575) can be created using sample values of the reconstructed low-resolution version of the input picture.

In general, the mapper (570) is configured to perform various color space conversion operations, chroma rate upsampling operations, projection operations, interpolation operations, and spatial upsampling operations. For example, the mapper (570) is configured to convert at least some of the sample values produced by the video decoder(s) (550) from a first color space (such as a YUV color space) to a second color space (such as an RGB color space). The mapper (570) can be configured to, before color space conversion or as part of color space conversion, perform chroma sample rate upsampling, to restore chroma sample values to have the same resolution as luma sample values in the decoded video. To create the output picture (575), the mapper (570) can be configured to project the reconstructed section(s) (555) from an intermediate projection (e.g., a sinusoidal projection) to an output projection (e.g., a screen projection). To create the output picture (575), the mapper (570) can also be configured to project the reconstructed low-resolution version of the input picture from an input projection (e.g., equirectangular projection, cubemap projection) or intermediate projection (e.g., a sinusoidal projection) to an output projection (e.g., a screen projection). The mapper (570) is configured to determine appropriate sample values of the output picture (575) from sample values at corresponding locations in the reconstructed section(s) (555) or reconstructed low-resolution version of the input picture, potentially selecting sample values at the corresponding locations or performing interpolation operations (e.g., bilinear interpolation operations) to determine sample values at the corresponding locations between adjacent sample values of the reconstructed section(s) (555) or reconstructed low-resolution version of the input picture. The mapper (570) can be configured to perform spatial upsampling operations on sample values of the reconstructed low-resolution version of the input picture, to reverse downsampling operations performed when creating the low-resolution version of the input picture.

The output buffer(s) (585) are configured to store the output picture (575) for output to a display device (590). The display device (590) can be a head-mounted display, computer monitor, television screen, mobile device screen, or other type of display device.

In some example implementations, for a platform rendering mode, the mapper (570) provides the output picture (575) in a screen projection (586) to the application (580), e.g., to an output buffer (585) indicated by the application (580) for rendering. The application (580) can be a lightweight application that does not itself perform rendering operations for panoramic video, which simplifies implementation for the application (580). For example, the application (580) is a news viewer, real estate site listing application, or other application that does not specialize in presentation of panoramic video. Instead, the application (580) provides a view direction (582) and may also provide a field of view (584), and the "platform" (system-provided modules of the playback tool (500)) performs operations to generate a screen projection. Alternatively, the application (580) can set a source for view direction (582) and field of view (584), and the platform gets the view direction (582) and field of view (584) information from that source. The application (580) may also have an on/off control for rendering.

In other example implementations, in an application rendering mode, the mapper (570) provides the output picture (575) in a flat projection to the application (580), e.g., to an output buffer (585) indicated by the application (580). The flat projection can be an equirectangular projection or a cubemap projection, which may be re-projected so that it is centered at the view window, may have irrelevant details cropped away, and/or may have its spatial resolution enhanced for relevant details. In application rendering mode, the application (580) includes a module that performs additional transformations to the sample values of the output picture (575) in the flat projection (e.g., mapping to spherical projection, mapping to screen projection) so as to generate one or more screen projections appropriate for the application (580), which gives the application (580) more control over rendering decisions. For example, the application (580) is a VR application, AR application, or specialty media application for panoramic video. In application rendering mode, different applications can use different approaches to rendering of flat projections. For a mobile device or computer monitor, a single screen projection may be rendered. Or, for a head-mounted display (or mobile device held in a head-mounted band), an application (580) may generate two screen projections, for the left and right eyes, respectively.

The streaming controller (520) can selectively retrieve encoded data for additional bitstream(s). For example, if playback of panoramic video is paused, the streaming controller (520) can request encoded data for the rest of an input picture, and the video decoder(s) (550) can decode the rest of the input picture. In this way, the entire input picture is available for rendering should the viewer choose to navigate through the "paused" environment of the panoramic video.

Depending on implementation and the type of processing desired, modules of the panoramic video playback tool (500) can be added, omitted, split into multiple modules, combined with other modules, and/or replaced with like modules. For example, although shown separately in FIG. 5, the view controller (510) can be combined with the mapper (570) (i.e., part of the mapper (570)), or the view controller (510) can be combined with the streaming controller (520) (i.e., part of the streaming controller (520)). In alternative embodiments, panoramic video playback tools with different modules and/or other configurations of modules perform one or more of the described techniques. Specific embodiments of panoramic video playback tools typically use a variation or supplemented version of the panoramic video playback tool (500). The relationships shown between modules within the panoramic video playback tool (500) indicate general flows of information in the panoramic video playback tool (500); other relationships are not shown for the sake of simplicity.

In general, a given module of the panoramic video playback tool (500) can be implemented by software executable on a CPU, by software controlling special-purpose hardware (e.g., a GPU or other graphics hardware for video acceleration), or by special-purpose hardware (e.g., in an ASIC). In particular, in some example implementations, video decoding operations and re-projection operations to map sample values between different projections are implemented with shader instructions executable on a GPU. Thus, computationally-intensive, repetitive operations (e.g., for video decoding, for mapping between different types of projections when creating an output picture) are likely to be implemented with graphics hardware (e.g., as shader instructions for a GPU) or other special-purpose hardware, and higher-level operations (e.g., selecting which streams to request) are likely to be implemented in software executable on a CPU.

VI. Examples of Panoramic Video Streaming with Overlapping Sections

This section describes examples of panoramic video streaming with overlapping sections. Some examples relate to stream configuration operations, and other examples relate to playback operations.

Partitioning pictures of panoramic video into overlapping sections can decrease overall compression efficiency, because the same sample values (for overlap regions) are encoded separately in different sections. That is, more bits are used for encoded data for the overlapping sections, collectively.

On the other hand, partitioning pictures of panoramic video into overlapping sections also tends to reduce the incidence of playback disruption attributable to bitstream switching. For example, when gradual panning motion or zooming causes a view window to no longer overlap a section, the overlapping can allow a playback tool to render high-resolution views quickly and without playback disruption. Switching to a new bitstream for a new section can take time (e.g., to send the request for the new bitstream to a media server, and to wait for a switch point at which decoding can begin in the new bitstream). With overlapping sections, if the view direction and/or zoom factor changes, the playback tool can more quickly identify new sections/streams that are to be used to create an output picture for the view window. Because of overlap between adjacent sections, for changes in view direction and/or zoom factor that are gradual and consistent, the playback tool in effect preemptively fetches encoded data for a new section as the view window moves out of a current section into the new section. By the time the view window reaches a non-overlapping part of the adjacent, new section, content for the adjacent, new section has already been retrieved and reconstructed, assuming the motion of the view window is not extreme. This hides network latency and stream switching latency from the viewer, and disruption of playback is avoided. Thus, using overlapping sections can facilitate local responsiveness where there are gradual changes in view direction or zoom during playback. Using overlapping sections provides for some "cushion" if a view window suddenly changes position within sections whose content has been retrieved and reconstructed.

Figure 6A:
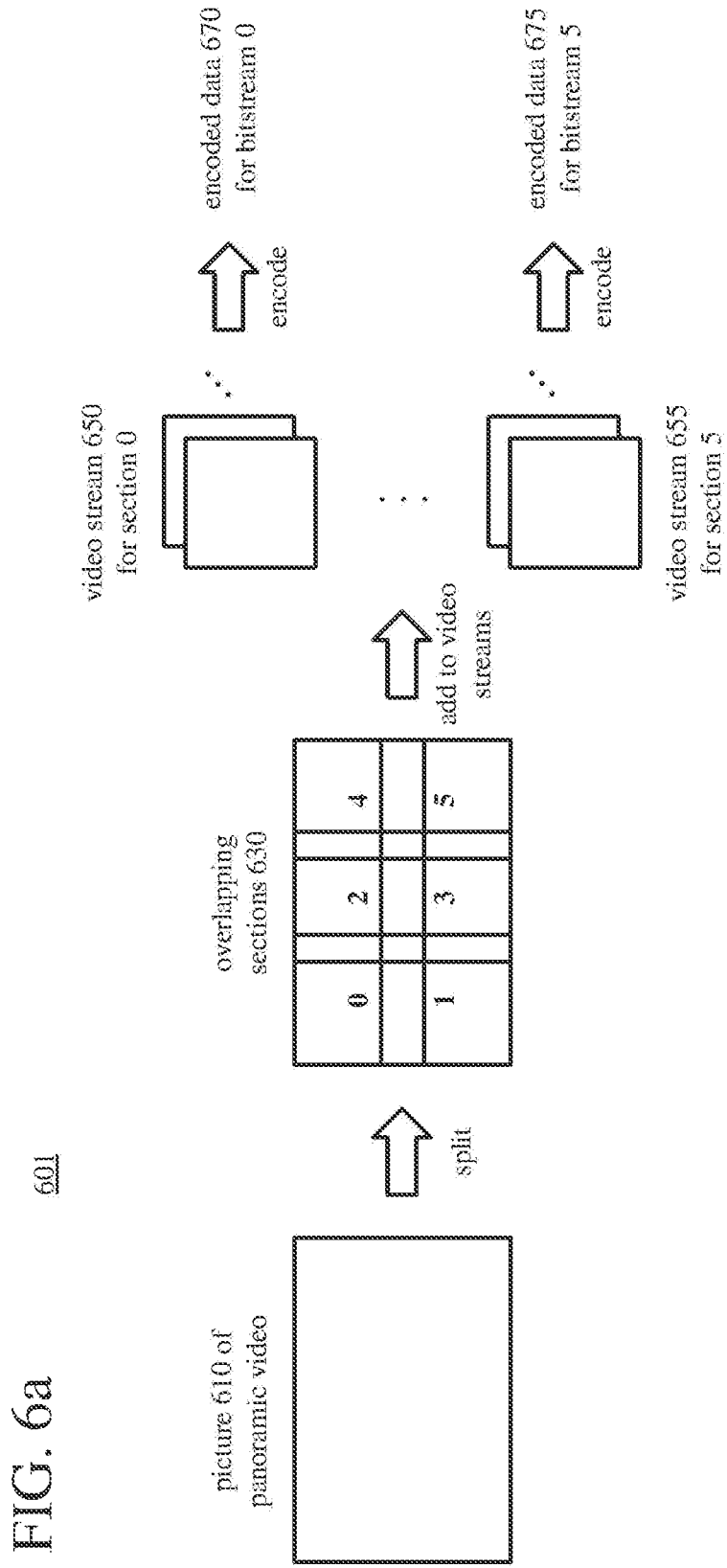
FIGS. 6a and 6b are diagrams illustrating examples of stream configuration operations for adaptive streaming of panoramic video with overlapping sections.

A. First Example of Stream Configuration Operations for Adaptive Streaming of Panoramic Video with Overlapping Sections FIG. 6a shows a first example (601) of stream configuration operations for adaptive streaming of panoramic video with overlapping sections. In the first example (601), an input picture (610) of panoramic video is in an equirectangular projection.

With reference to FIG. 6a, a stream configuration tool receives or creates a series of input pictures—such as the input picture (610)—in an equirectangular projection. The input pictures can be created from multiple camera video streams (associated with different views from a central position) or from a video stream from an omnidirectional camera. For example, the resolution of the input pictures in the equirectangular projection is 4K (3840×2160) or higher.

For different values of phi ($\varphi$) and theta ($\theta$) in spherical projection coordinates, the stream configuration tool splits the input picture (610) into overlapping sections (630). In general, the overlapping sections (630) are associated with different view directions. Each of the overlapping sections (630) corresponds to a region of the surface of the sphere for the panoramic video, and is parameterized using a range of phi and theta coordinates for the surface of the sphere. Alternatively, the sections (630) can be parameterized in some other way.

The overlapping sections (630) can have the same size or different sizes. For example, each of the overlapping sections (630) has a spatial resolution of 1080p, 720p, or some other size. Collectively, the overlapping sections (630) cover all of the actual content of the input picture (610). In FIG. 6a, the input picture (610) is partitioned into six overlapping sections. More generally, the number n of sections depends on implementation (e.g., n is 8, 12, 16, or 32). Each of the overlapping sections (630) overlaps with neighboring sections of the input picture (610). The extent of overlap depends on implementation (e.g., 10%, 20%, 30%). In general, having more extensive overlap provides more "lead time" for retrieval of encoded data for adjacent sections when view direction, field of view, or zoom factor changes during playback. On the other hand, having more extensive overlap results in redundant encoding of more sample values, which can increase overall bit rate and increase the bit rate per stream (section).

The extent of overlap can be static. For example, by default, the input picture (610) is always partitioned in the same way (or in a way that depends on resolution of the input picture (610), picture size for the video streams to be encoded, extent of overlap, or other factors known at the start of stream configuration). Alternatively, the count of overlapping sections (630), sizes of overlapping sections (630), and extent of overlap can be configurable and/or adjustable during stream configuration and playback. In particular, the extent of overlap can be adjusted depending on factors such as the expected reliability of a network connection and how much the position of a view window is expected to change (e.g., due to panning or zooming). If a network connection is reliable, less overlap is needed to hide latency problems for stream switching events. If a network connection is unreliable, more overlap is needed to hide latency problems for stream switching events. If the position of a view window is expected to be stationary, less overlap is needed to hide latency problems for stream switching events. If the position of a view window is expected to change quickly, more overlap is needed to hide latency problems for stream switching events.

Different variations of partitioning can be applied that have different extents of overlap. For example, resources permitting, one version of overlapping sections (630) can have less overlap (e.g., 5%) and be used for playback tools that have view windows that are relatively stationary and connect over reliable network connections. Another version of sections can have more overlap (e.g., 30%) and be used for playback tools that have view windows that change position quickly and/or are connect over unreliable network connections.

The stream configuration tool can generate as many phi/theta combinations as desired for the overlapping sections (630). These combinations can be preset or adapted to a requested view. For example, the "center" of the partitioning pattern can change, based on where the focus (or expected focus) of most view windows will be. If there is a section/stream centered at the focus, a playback tool might not need to request and combine sections from multiple bitstreams. Alternatively, a new section could simply be added, centered at the focus.

The stream configuration tool also creates a manifest file (not shown) that indicates the spherical coordinates associated with the respective overlapping sections (630). Alternatively, parameters can be sent in some other way for each of the overlapping sections (630), indicating what part of the input picture (610) is covered by that section. The parameters can be values of phi and theta per section or other information used to derive the same information about the scope of the section.

The stream configuration tool adds the overlapping sections (630) to corresponding video streams. In FIG. 6a, the six overlapping sections (630) are added to corresponding video streams (650 . . . 655), respectively.

The stream configuration tool encodes the corresponding video streams (650 . . . 655), respectively, producing bitstreams of encoded data (670 . . . 675) for the respective sections. Thus, the stream configuration tool encodes the multiple overlapping sections (630) partitioned from the input picture (610) as part of different video streams (650 . . . 655). Section 1 is encoded as a picture of stream 1, section 2 is encoded as a picture of stream 2, and so on.

In this way, different sections of the input picture (610) of panoramic video are represented in different bitstreams of encoded data (670 . . . 675).

Finally, the stream configuration tool buffers the encoded data (670 . . . 675). The encoded data (670 . . . 675) can be directly sent to one or more playback tools. In most configurations, however, the encoded data (670 . . . 675) is sent to a media server. The media server can also store a manifest file with details about the overlapping sections (630) and streams.

Figure 6B:
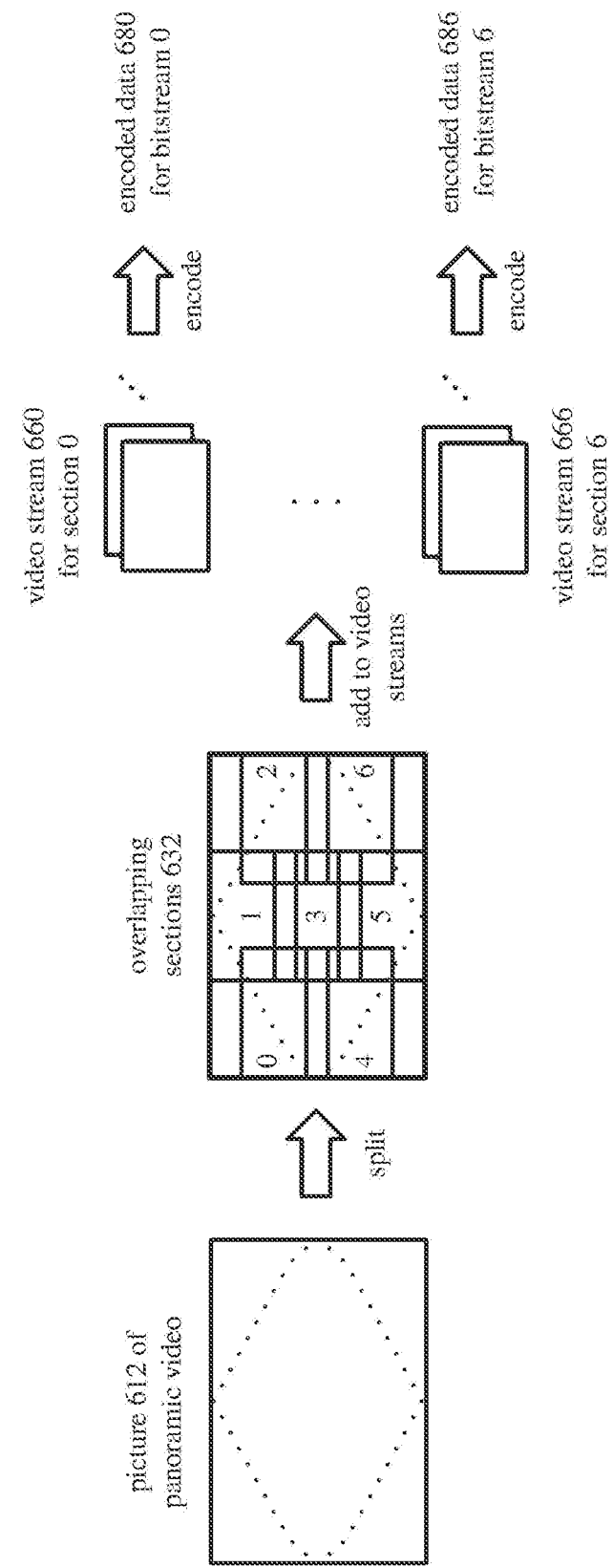

B. Second Example of Stream Configuration Operations for Adaptive Streaming of Panoramic Video with Overlapping Sections FIG. 6b shows a second example (602) of stream configuration operations for adaptive streaming of panoramic video with overlapping sections. In the second example (602), the input picture (612) is in a sinusoidal projection.

With reference to FIG. 6b, the stream configuration tool receives or creates a series of input pictures—such as the input picture (612)—in a sinusoidal projection. From an input picture in an equirectangular projection or cubemap projection, the stream configuration tool can convert the input picture to a sinusoidal projection. The sinusoidal projection can have a single fold or multiple folds (e.g., two-fold projection). For a single-fold sinusoidal projection, the sinusoidal projection includes panoramic video content surrounded by empty regions (e.g., with default values such as black or gray). For a two-fold sinusoidal projection, the sinusoidal projection includes panoramic video content for two "hemispheres" separated by empty regions (e.g., with default values such as black or gray). For example, the resolution of the input pictures in the sinusoidal projection is 8K or higher, which is higher than the input picture in the equirectangular representation. Compared to the equirectangular projection, the sinusoidal projection represents content towards the "poles" of the sphere without excessive stretching, distortion, etc., which can make subsequent compression operations (such as motion estimation) more effective. (In the equirectangular projection, details around the poles are scattered and stretched. Redundancy cannot be exploited as well during compression.)

For different values of phi ($\varphi$) and theta ($\theta$) in spherical projection coordinates, the stream configuration tool splits the input picture (612) into overlapping sections (632), generally as described with reference to FIG. 6a. Since the input picture (612) is in a sinusoidal projection, however, the overlapping sections (632) can include default sample values (e.g., black or gray) for portions in empty regions outside of the actual content of the input picture (612). In the partitioning, the placement of the overlapping sections (632) can be configured to reduce the number of default sample values in the sections. Collectively, the overlapping sections (632) still cover all of the actual content of the input picture (612) of panoramic video. In FIG. 6b, the input picture (612) is partitioned into seven overlapping sections. More generally, the number n of sections depends on implementation (e.g., n is 8, 12, 16, or 32). The extent of overlap between the overlapping sections (632) depends on implementation and can be static or dynamic, generally as described with reference to FIG. 6a. The stream configuration tool can generate various phi/theta combinations for the overlapping sections (632), generally as described with reference to FIG. 6a.

Although FIG. 6b shows a separate input picture (612) in a sinusoidal projection, in practice, conversion of an input picture to a sinusoidal projection can be notional. That is, sample values of the respective overlapping sections (632) in the sinusoidal projection can be determined directly from the input picture in an equirectangular projection, cubemap projection, or other input projection.

The stream configuration tool can create a manifest file, generally as described with reference to FIG. 6a. The stream configuration tool adds the overlapping sections (632) to corresponding video streams. In FIG. 6b, the seven overlapping sections (632) are added to corresponding video streams (660 . . . 666), respectively. The stream configuration tool encodes the corresponding video streams (660 . . . 666), respectively, producing bitstreams of encoded data (680 . . . 686) for the respective sections. Thus, the stream configuration tool encodes the multiple overlapping sections (632) partitioned from the input picture (612) as part of different video streams (660 . . . 666). Section 1 is encoded as a picture of stream 1, section 2 is encoded as a picture of stream 2, and so on. In this way, different sections of the input picture (612) of panoramic video are represented in different bitstreams of encoded data (680 . . . 686). Finally, the stream configuration tool buffers the encoded data (680 . . . 686). The encoded data (680 . . . 686) can be directly sent to one or more playback tools. In most configurations, however, the encoded data (680 . . . 686) is sent to a media server, which can also store manifest files with details about the overlapping sections (632) and streams.

C. Example of Picture of Panoramic Video with Overlapping Sections

Figure 7:
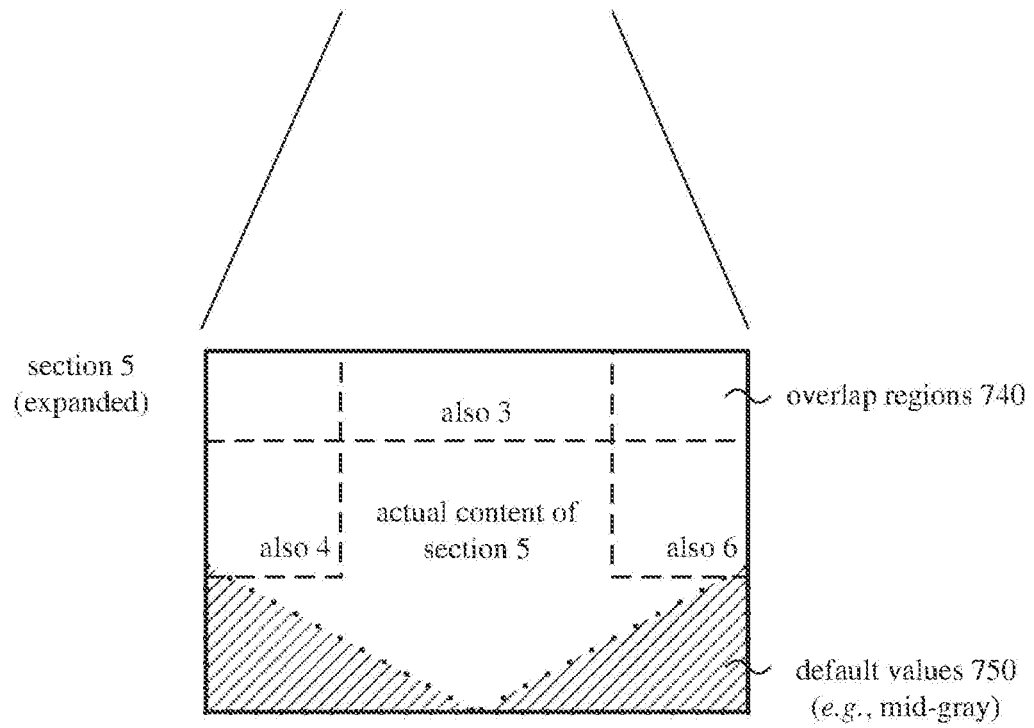
FIG. 7 is a diagram illustrating an example of overlapping section of a picture of panoramic video in a sinusoidal projection.

FIG. 7 is a diagram illustrating an example (700) of overlapping sections of a picture (710) of panoramic video in a sinusoidal projection. The picture (710) in the sinusoidal projection has been partitioned into seven overlapping sections of equal size. The overlapping sections are labeled 0 . . . 6.

FIG. 7 also shows an expanded view of one of the overlapping section—section 5. Section 5 includes actual content of the picture (710) of panoramic video—shown with no hatching. While section 5 includes some actual content that is only part of section 5 (and not any other section), the overlap regions (740) of section 5 include actual content that is also part of one or more other sections (specifically, sections 3, 4, and 6). If a view window moves into one or more of the overlap regions (740), a playback tool can preemptively fetch content for one or more of the adjacent sections that also includes that overlap region. Section 5 also includes default values (750) (e.g., mid-gray values) for empty regions, which are shown with hatching.

D. First Example of Playback Operations for Adaptive Streaming of Panoramic Video with Overlapping Sections FIG. 8a shows a first example (801) of playback operations for adaptive streaming of panoramic video with overlapping sections. In the first example (801), overlapping sections (830) of a picture of panoramic video are in an equirectangular projection.

A playback tool periodically determines a view window (811) in a spherical projection (810) of the panoramic video for a viewer. During playback, the viewer can control view direction, relative to a viewer/camera position at the center of the panoramic video. The viewer may also be able to control the field of view (e.g., narrow, wide) and/or zoom factor. The view window (811) depends on view direction, and can also depend on field of view and/or zoom factor.

The playback tool also requests a manifest file from a media server (or stream configuration tool). After receiving the manifest file, the playback tool identifies which sections of the panoramic video are to be used to create an output picture (890) for the view window (811). Specifically, the playback tool identifies one or more sections that each contain at least part of the view window (811). FIG. 8a shows overlapping sections (830) of a picture of panoramic video. In FIG. 8a, two of the overlapping sections (830)—sections 4 and 5—each contain at least part of the view window (811), which is shown as a projection (834) onto the picture of panoramic video. The playback tool selects one or more bitstreams for the identified section(s), respectively.

The playback tool requests encoded data for the selected bitstream(s). For example, depending on configuration, the playback tool requests the encoded data from the stream configuration tool or a media server. The playback tool can request encoded data for the selected bitstream(s) on a picture-by-picture basis or some other basis. In the example (801) of FIG. 8a, the playback tool requests encoded data (854) for bitstream 4 and requests encoded data (855) for bitstream 5.

The playback tool receives and decodes the encoded data for the selected bitstream(s), thereby reconstructing the identified section(s). In the example (801) of FIG. 8a, the playback tool decodes the encoded data (854) for bitstream 4 to reconstruct section 4 (874), and the playback tool decodes the encoded data (855) for bitstream 5 to reconstruct section 5 (875).

The playback tool creates an output picture (890) for the view window (811) from the reconstructed section(s). In doing so, for locations of the output picture (890), the playback tool selects sample values at corresponding locations of the reconstructed section(s), or determines sample values at the corresponding locations by interpolating between adjacent sample values of the reconstructed section(s). The output picture (890) can be in a screen projection (for display) or other (e.g., equirectangular) projection (for subsequent rendering). Thus, to find the corresponding locations in the reconstructed section(s), the playback tool can warp between different projections, e.g., from a screen projection for the output picture to an equirectangular projection for the overlapping sections (830). The playback tool can also perform various post-processing operations (e.g., color conversion to a color space appropriate for a display device).

During playback, if the view window (811) changes, the playback tool can identify new sections/bitstreams to be used to create an output picture (890) for the view window (811). Because of the overlap between adjacent sections, for changes in view direction and/or zoom factor that are gradual and consistent, the playback tool can, in effect, preemptively fetch a new section as the view window (811) moves out of a current section into the new section. By the time the view window (811) reaches a non-overlapping part of the new section, content for the new section has already been retrieved and reconstructed. In this way, the playback tool can hide network latency and stream switching latency from the viewer, and disruption of playback is avoided.

Figure 8B:
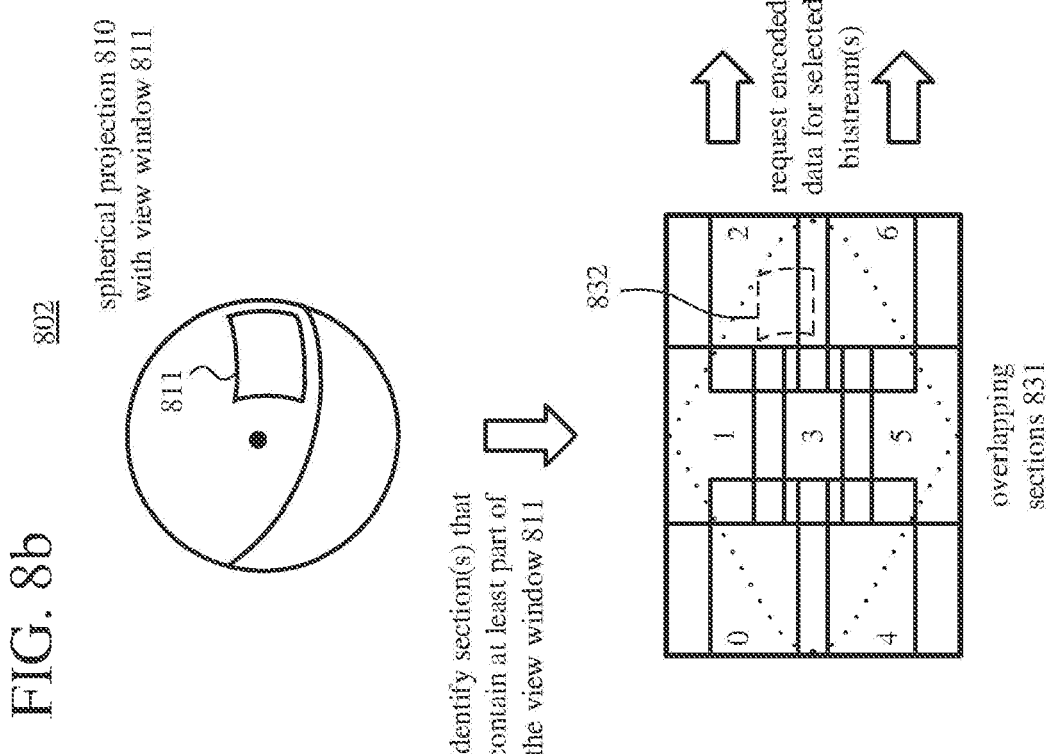

E. Second Example of Playback Operations for Adaptive Streaming of Panoramic Video with Overlapping Sections FIG. 8b shows a second example (802) of playback operations for adaptive streaming of panoramic video with overlapping sections. In the second example (802), overlapping sections (831) of a picture of panoramic video are in a sinusoidal projection. The overlapping sections (831) of the picture of panoramic video can be organized as described with reference to the example (602) of FIG. 6b.

As in the example (801) of FIG. 8a, a playback tool periodically determines a view window (811) in a spherical projection (810) of the panoramic video for a viewer. After receiving a manifest file, the playback tool identifies which of the overlapping sections (831) of the panoramic video are to be used to create an output picture (892) for the view window (811). Specifically, the playback tool identifies one or more of the overlapping sections (831) that each contain at least part of the view window (811). In FIG. 8b, two of the overlapping sections (831)—sections 2 and 6—each contain at least part of the view window (811), which is shown as a projection (832) onto the picture of panoramic video. The playback tool selects one or more bitstreams for the identified section(s), respectively.

The playback tool requests encoded data for the selected bitstream(s), generally as described with reference to FIG. 8a. In the example (802) of FIG. 8b, the playback tool requests encoded data (852) for bitstream 2 and requests encoded data (856) for bitstream 6. The playback tool receives and decodes the encoded data for the selected bitstream(s), thereby reconstructing the identified section(s). In the example (802) of FIG. 8b, the playback tool decodes the encoded data (852) for bitstream 2 to reconstruct section 2 (872), and the playback tool decodes the encoded data (856) for bitstream 6 to reconstruct section 6 (876). The playback tool creates an output picture (892) for the view window (811) from the reconstructed section(s), generally as described with reference to FIG. 8a. To find the corresponding locations in the reconstructed section(s), the playback tool can warp between different projections, e.g., from a screen projection for the output picture to a sinusoidal projection for the overlapping sections (831).

VII. Example Techniques for Stream Configuration of Panoramic Video with Overlapping Sections FIG. 9 shows an example technique (900) for stream configuration of panoramic video with overlapping sections. A panoramic video stream configuration tool as described with reference to FIG. 4, or other panoramic video stream configuration tool, can perform the example technique (900).

The stream configuration tool receives (910) an input picture of panoramic video. Typically, the input picture is in an input projection such as an equirectangular projection, a cubemap projection, or a sinusoidal projection. The stream configuration tool splits (920) the input picture into multiple overlapping sections according to partition settings. For example, the partition settings include the count of sections, sizes of sections, positions of sections, and extent of overlap between sections. Each of the multiple sections overlaps at least one other section among the multiple sections. (This ultimately decreases overall compression efficiency but facilitates reduction of incidence of disruption attributable to bitstream switching during playback of the panoramic video.) For example, for each of the multiple sections, the section overlaps each adjacent section among the multiple sections.

In some configurations, the stream configuration tool projects the input picture from an input projection to an intermediate projection when splitting the input picture into multiple sections (in the intermediate projection). For example, the input projection is an equirectangular projection or a cubemap projection, and the intermediate projection is a sinusoidal projection. When the multiple sections are in a sinusoidal projection, at least one of the multiple sections may include at least some sample values having default values (e.g., black values or gray values, not representing content of the input picture of panoramic video).

The stream configuration tool adds (930) the multiple sections, respectively, to corresponding video streams for encoding.

FIG. 9 shows two loops. As part of a loop for a formatting pipeline, the stream configuration tool checks (940) whether to continue operations for a next input picture. If so, the stream configuration tool receives (910) the next input picture, splits (920) it into multiple overlapping sections, and adds (930) the sections to corresponding video streams. In this way, the stream configuration tool iteratively splits input pictures and adds sections for the input pictures to corresponding video streams.

As part of an encoding pipeline, the stream configuration tool encodes (950) the multiple sections in the corresponding video streams, respectively, for an input picture. This produces encoded data for the multiple sections as part of multiple bitstreams for the corresponding video streams, respectively. Typically, the bitstreams are video elementary bitstreams. The encoded data in the video elementary bitstreams can be multiplexed into a single container stream for delivery to a media server. The stream configuration tool stores (960) the encoded data for delivery (e.g., to a media server, or directly to one or more panoramic video playback tools). The stream configuration tool checks (970) whether to continue encoding operations and, if so, encodes (950) the sections of the next input picture. In this way, as part of a loop for the encoding pipeline, the stream configuration tool encodes the sections of pictures added to video streams in the formatting pipeline.

The stream configuration tool can also produce one or more manifest files. The manifest file(s) include information indicating, for each of the multiple bitstreams, the position of one of the multiple sections (in terms of an input projection or spherical projection) whose content is part of the corresponding video stream for that bitstream. For example, for each section, the manifest file includes phi and theta coordinates for the section. The stream configuration tool can deliver the manifest file(s) to a media server, for subsequent delivery to one or more playback tools. Or, the stream configuration tool can directly deliver the manifest file(s) to one or more playback tools. The manifest file(s) can be delivered as user data of elementary bitstreams, as metadata in a container, or in some other way. Alternatively, the stream configuration tool and playback tool(s) can operate without exchanging information in manifest file(s), and input pictures are partitioned into sections according to a static, pre-defined pattern.

In some configurations, the partition settings can adaptively change. For example, the stream configuration tool can receive an indication of feedback and, based at least in part on the indication of feedback, adjust the partition settings. The indication of feedback can include an indication of network connection quality, an indication of magnitude of view window change activity, an indication of which view direction is prevalent, and/or some other type of feedback. To adjust the partition settings, the stream configuration tool can change an extent of overlap between the multiple sections. For example, if network connection quality is poor or view window change activity is high, the stream configuration tool can increase the extent of overlap between adjacent sections. Or, if network connection quality is good and view window change activity is low, the stream configuration tool can decrease the extent of overlap between adjacent sections. Alternatively, the stream configuration tool can change the count of overlapping sections, change relative sizes of at least some of the overlapping sections, change positions of at least some of the overlapping sections, add one or more sections, at new positions, to the overlapping sections, and/or remove one or more sections from the overlapping sections. For example, in response to an indication of which view direction is prevalent, the stream configuration tool can add one or more sections or re-position sections to focus on the prevalent view direction (and thereby reduce the incidence of switching around the prevalent view direction). Alternatively, the stream configuration tool can make some other change to the partition settings.

VIII. Example Techniques for Playback of Panoramic Video with Overlapping Sections FIG. 10 shows an example technique (1000) for playback of panoramic video with overlapping sections. A panoramic video playback tool as described with reference to FIG. 5, or other panoramic video playback tool, can perform the example technique (1000).

The panoramic video playback tool determines (1010) a view window for playback of panoramic video. For example, the view window depends on view direction, field of view, and/or zoom factor. The playback tool can receive an indication of a view direction for an application. For example, the indication of the view direction is a set of heading, pitch, and roll values for the view direction. Or, the indication of the view direction is a set of affine transform coefficients that specify a spatial rotation for the view direction. Or, the view direction is specified in some other way. The playback tool can receive the indication of the view direction from the application or from a source specified by the application. The playback tool can also receive an indication of a field of view and/or zoom factor for the application.

From among multiple sections of the panoramic video, the playback tool identifies (1020) one or more sections that contain at least part of the view window. Each of the multiple sections overlaps at least one other section among the multiple sections, which reduces incidence of disruption attributable to bitstream switching. For example, the playback tool identifies each of the overlapping sections that contains at least part of the view window. For the identified section(s), the playback tool selects (1030) one or more bitstreams among multiple bitstreams for corresponding video streams.

FIG. 10 shows two loops. As part of a loop for a view window pipeline, the playback tool checks (1040) whether there has been a change to the view window (e.g., due to a change in view direction, field of view, or zoom factor). If so, the playback tool determines (1010) the view window, identifies (1020) the section(s) that contain the view window, and selects (1030) the bitstream(s) for the identified section(s). In this way, the playback tool can iteratively perform operations to determine (1010) the view window, identify (1020) the section(s) that contain at least part of the view window, and select (1030) the bitstream(s) for the identified section(s).

As part a decoding and reconstruction pipeline, the playback tool requests (1050) encoded data, in the selected bitstream(s) for the identified section(s), respectively, for an input picture of the panoramic video. Depending on configuration, the playback tool can request the encoded data from a media server or directly from a panoramic video stream configuration tool. The playback tool can make separate requests for portions of an input picture or for each input picture, or the playback tool can batch requests.

The playback tool receives (1060) the encoded data (e.g., from a media server, or directly from a panoramic video stream configuration tool). The playback tool decodes (1070) the encoded data to reconstruct sample values for the identified section(s) for the input picture. Then, based at least in part on the reconstructed section(s), the playback tool creates (1080) an output picture. When creating the output picture, the playback tool can project the reconstructed section(s) from an input projection (e.g., an equirectangular projection) or an intermediate projection (e.g., sinusoidal projection) to an output projection (e.g., screen projection). The playback tool stores (1090) the output picture for output to a display device. The playback tool checks (1095) whether to continue decoding and reconstruction operations and, if so, requests (1050) and decodes (1070) encoded data for one or more sections of the next input picture. In this way, as part of a loop for the decoding and reconstruction pipeline, the playback tool reconstructs sections identified in the view window pipeline.

The playback tool can receive one or more manifest files (e.g., from a media server or directly from a stream configuration tool). The manifest file(s) include information indicating, for each of the multiple bitstreams, the position of one of the multiple sections (in terms of an input projection or spherical projection) whose content is part of the corresponding video stream for that bitstream. For example, for each section, the manifest file includes phi and theta coordinates for the section. The playback tool can use the manifest file(s) to identify (1020) the section(s) that contain at least part of the view window and/or select (1030) the bitstream(s) for the identified sections. The playback tool can also use the manifest file(s) when creating (1080) the output picture based on the reconstructed section(s). The manifest file(s) can be delivered as user data of elementary bitstreams, as metadata in a container, or in some other way. Alternatively, the stream configuration tool and playback tool(s) can operate without exchanging information in manifest file(s), and input pictures are partitioned into sections according to a static, pre-defined pattern.

The playback tool can send an indication of feedback to a stream configuration tool or intermediary that aggregates feedback. The indication of feedback can include an indication of network connection quality, an indication of magnitude of view window change activity, an indication of which view direction is prevalent, and/or some other type of feedback. The feedback can be used to adjust partition settings, for example, as described in the previous section.

IX. Examples of Panoramic Video Streaming with Composite Pictures

This section describes examples of panoramic video streaming with composite pictures. Some examples relate to stream configuration operations, and other examples relate to playback operations.

A composite picture includes a high-resolution section of an input picture of panoramic video as well as a low-resolution version of the input picture. Under normal operation, a playback tool can use reconstructed high-resolution section(s) to render high-quality views of the panoramic video. If the view window drastically changes, however, or if encoded data for a specific section is lost or corrupted, the playback tool can temporarily use the low-resolution version of the input picture to render lower-quality details for views of the panoramic video, without disruption of playback, until encoded data for the high-resolution section(s) is retrieved or recovered.

Using composite pictures of panoramic video can decrease overall compression efficiency, because sample values for low-resolution versions of input pictures, which might not be used in rendering at all, are redundantly encoded. That is, extra bits are used for encoded data for the low-resolution versions of the input pictures. On the other hand, using composite pictures also tends to reduce the incidence of playback disruption when a view window drastically changes or encoded data for a high-resolution section is lost or corrupted. When a view window changes drastically, switching to a new bitstream for a new section can take time (e.g., to send the request for the new bitstream to a media server, and to wait for a switch point at which decoding can begin in the new bitstream). Similarly, when encoded data for a high-resolution section is lost or corrupted, recovering encoded data of the bitstream for the section can take time. Until encoded data for the high-resolution section(s) is retrieved/recovered, the playback tool can use the low-resolution version of the input picture to render lower-quality details for views of the panoramic video, without disruption of playback. This hides network latency and stream switching latency from the viewer, and disruption of playback is avoided.

A. First Example of Stream Configuration Operations for Adaptive Streaming of Panoramic Video with Composite Pictures FIG. 11a shows a first example (1101) of stream configuration operations for adaptive streaming of panoramic video with composite pictures. In the first example (1101), an input picture (1110) of panoramic video is in an equirectangular projection.

With reference to FIG. 11a, a stream configuration tool receives or creates a series of input pictures—such as the input picture (1110)—in an equirectangular projection. The input pictures can be created from multiple camera video streams (associated with different views from a central position) or from a video stream from an omnidirectional camera. For example, the resolution of the input pictures in the equirectangular projection is 4K (3840×2160) or higher.

For different values of phi ($\varphi$) and theta ($\theta$) in spherical projection coordinates, the stream configuration tool splits the input picture (1110) into sections (1120). The sections (1120) can be non-overlapping or, as described section VI, overlapping. In general, the sections (1120) are associated with different view directions. Each of the sections (1120) corresponds to a region of the surface of the sphere for the panoramic video, and is parameterized using a range of phi and theta coordinates for the surface of the sphere. Alternatively, the sections (1120) can be parameterized in some other way. The sections (1120) can have the same size or different sizes. For example, each of the sections (1120) has a spatial resolution of 1080p, 720p, or some other size. Collectively, the sections (1120) cover all of the actual content of the input picture (1110). In FIG. 11a, the input picture (1110) is partitioned into six non-overlapping sections. More generally, the number n of sections depends on implementation (e.g., n is 8, 12, 16, or 32).

By default, the input picture (1110) is always partitioned in the same way (or in a way that depends on resolution of the input picture (1110), picture size for the video streams to be encoded, or other factors known at the start of stream configuration). Alternatively, the count of sections (1120) and sizes of sections (1120) can be configurable and/or adjustable during stream configuration and playback.

The stream configuration tool can generate as many phi/theta combinations as desired for the overlapping sections (1120). These combinations can be preset or adapted to a requested view. For example, the "center" of the partitioning pattern can change, based on where the focus (or expected focus) of most view windows will be. If there is a section/stream centered at the focus, a playback tool might not need to request and combine sections from multiple bitstreams. Alternatively, a new section could simply be added, centered at the focus.

The stream configuration tool also creates a manifest file (not shown) that indicates the spherical coordinates associated with the respective sections (1120). Alternatively, parameters can be sent in some other way for each of the sections (1120), indicating what part of the input picture (1110) is covered by that section. The parameters can be values of phi and theta per section or other information used to derive the same information about the scope of the section.

The stream configuration tool creates a low-resolution version (1130) of the input picture of panoramic video. For example, the stream configuration tool downsamples the input picture (1110) of panoramic video. The stream configuration tool can downsample the input picture (1110) by the same factor horizontally and vertically, or by different factors horizontally and vertically.

The stream configuration tool adds the sections (1120) and the low-resolution version of the input picture to composite pictures (1140 . . . 1145). For each one of the sections (1120), the stream configuration tool combines that section and the low-resolution version (1130) of the input picture to make a corresponding one of the composite pictures (1140 . . . 1145). In this way, the stream configuration tool creates a different composite picture for each of the sections (1120). For example, composite picture 0 (1140) includes section 0 and the low-resolution version (1130) of the input picture. Composite picture 5 (1140) includes section 5 and the low-resolution version (1130) of the input picture.

In the example (1101) of FIG. 11a, the low-resolution version (1130) of the input picture is in an equirectangular projection. Alternatively, the low-resolution version (1130) of the input picture can be in a sinusoidal projection or other projection. The low-resolution version (1130) of the input picture can be in the same projection as the sections (1120) (e.g., both sinusoidal or both equirectangular) or different projection (e.g., sinusoidal for the sections (1120), equirectangular for the low-resolution version (1130) of the input picture).

The low-resolution version (1130) of the input picture can be put in the composite pictures (1140 . . . 1145) at a predefined location. Or, the location can be specified, e.g., in a manifest file. The low-resolution version (1130) of the input picture can be composited below one the sections (1120) or arranged in some other configuration in a single picture. Alternatively, the composite picture can be organized as multiple views in a frame packing arrangement.

The stream configuration tool adds the composite pictures (1140 . . . 1145) to corresponding video streams. In FIG. 11a, the six composite pictures (1140 . . . 1145) are added to corresponding video streams (1150 . . . 1155), respectively.

The stream configuration tool encodes the corresponding video streams (1150 . . . 1155), respectively, producing bitstreams of encoded data (1170 . . . 1175) for the respective composite pictures. Thus, the stream configuration tool encodes the composite pictures (1140 . . . 1145), including different sections (1120) of the input picture (1110), as part of different video streams (1150 . . . 1155). Composite picture 1 is encoded as a picture of stream 1, composite picture 2 is encoded as a picture of stream 2, and so on. In this way, composite pictures for different sections of the input picture (1110) of panoramic video are represented in different bitstreams of encoded data (1170 . . . 1175).

Finally, the stream configuration tool buffers the encoded data (1170 . . . 1175). The encoded data (1170 . . . 1175) can be directly sent to one or more playback tools. In most configurations, however, the encoded data (1170 . . . 1175) is sent to a media server. The media server can also store a manifest file with details about the sections (1120) and streams.

Figure 11B:
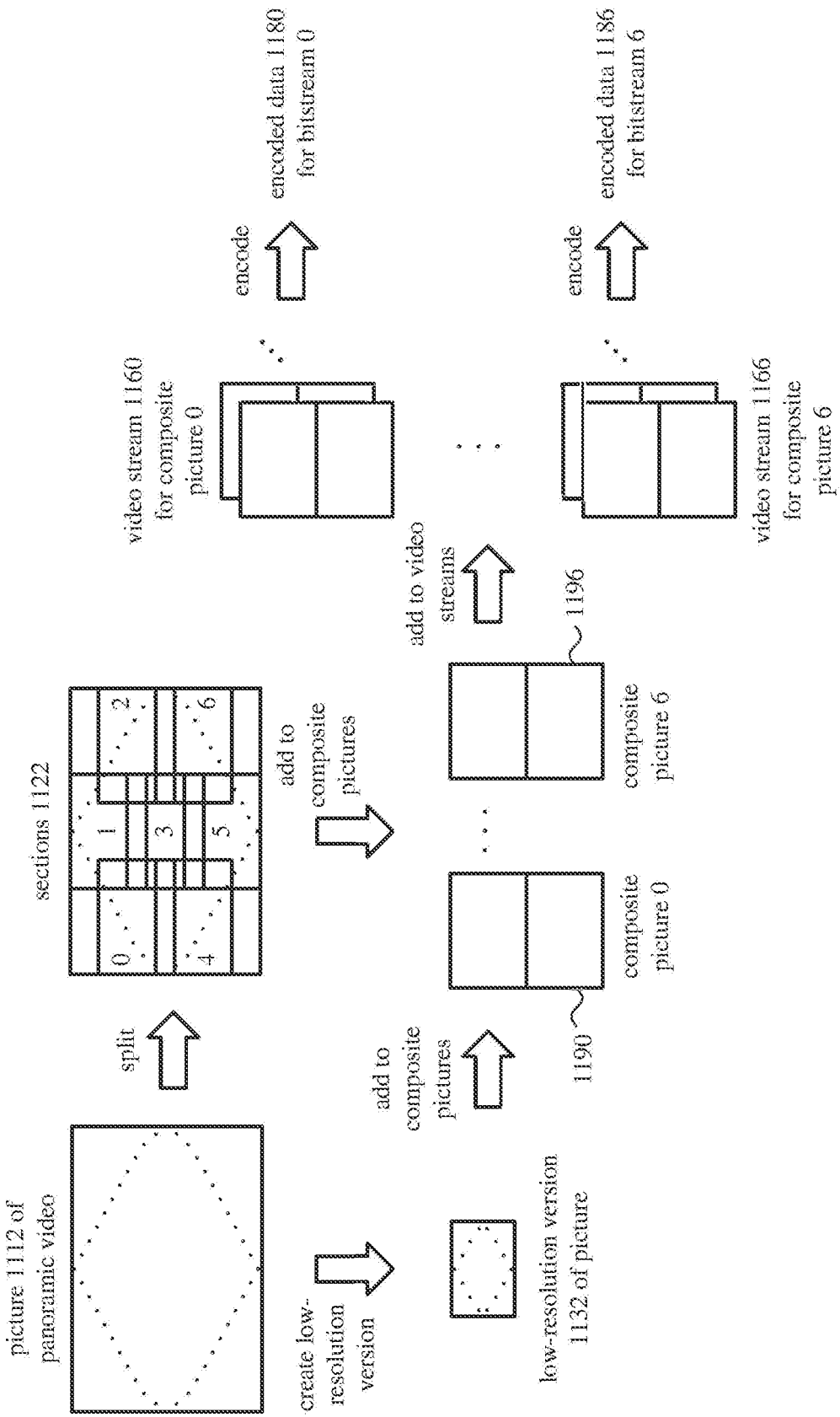

B. Second Example of Stream Configuration Operations for Adaptive Streaming of Panoramic Video with Composite Pictures FIG. 11b shows a second example (1102) of stream configuration operations for adaptive streaming of panoramic video with composite pictures. In the second example (1102), the input picture (1112) is in a sinusoidal projection, and the input picture (1112) is split into overlapping sections (1122).

With reference to FIG. 11b, the stream configuration tool receives or creates a series of input pictures—such as the input picture (1112)—in a sinusoidal projection. From an input picture in an equirectangular projection or cubemap projection, the stream configuration tool can convert the input picture to a sinusoidal projection, as described with reference to the example (602) of FIG. 6b.

For different values of phi ($\varphi$) and theta ($\theta$) in spherical projection coordinates, the stream configuration tool splits the input picture (1112) into overlapping sections (1122), generally as described in section VI. Since the input picture (1112) is in a sinusoidal projection, the overlapping sections (1122) can include default sample values (e.g., black or gray) for portions in empty regions outside of the actual content of the input picture (1112). In FIG. 11b, the input picture (1112) is partitioned into seven overlapping sections. More generally, the number n of sections depends on implementation (e.g., n is 8, 12, 16, or 32). The extent of overlap between the overlapping sections (1122) depends on implementation and can be static or dynamic, as described in section VI. The stream configuration tool can create a manifest file that includes information about the sections (1122), as described in section VI.

Although FIG. 11b shows a separate input picture (1112) in a sinusoidal projection, in practice, conversion of an input picture to a sinusoidal projection can be notional. That is, sample values of the respective overlapping sections (1122) in the sinusoidal projection can be determined directly from the input picture in an equirectangular projection, cubemap projection, or other input projection.

As described with reference to the example (1101) of FIG. 11a, the stream configuration tool creates a low-resolution version (1132) of the input picture of panoramic video. The low-resolution version (1132) of the input picture can be in the same projection as the sections (1122) (e.g., both sinusoidal) or different projection (e.g., sinusoidal for the sections (1122), equirectangular for the low-resolution version (1132) of the input picture).

The stream configuration tool adds the sections (1122) and the low-resolution version (1132) of the input picture to composite pictures (1190 . . . 1196). For each one of the sections (1122), the stream configuration tool combines that section and the low-resolution version (1132) of the input picture to make a corresponding one of the composite pictures (1190 . . . 1196). In this way, the stream configuration tool creates a different composite picture for each of the sections (1122). For example, composite picture 0 (1190) includes section 0 and the low-resolution version (1132) of the input picture. Composite picture 6 (1196) includes section 6 and the low-resolution version (1132) of the input picture.

The low-resolution version (1132) of the input picture can be put in the composite pictures (1190 . . . 1196) at a predefined location. Or, the location can be specified, e.g., in a manifest file. The low-resolution version (1132) of the input picture can be composited below one the sections (1122) or arranged in some other configuration in a single picture. Alternatively, a composite picture can be organized as multiple views in a frame packing arrangement.

The stream configuration tool adds the composite pictures (1190 . . . 1196) to corresponding video streams. In FIG. 11*b*, the seven composite pictures (1190 . . . 1196) are added to corresponding video streams (1160 . . . 1166), respectively. The stream configuration tool encodes the corresponding video streams (1160 . . . 1166), respectively, producing bitstreams of encoded data (1180 . . . 1186) for the respective composite pictures. Thus, the stream configuration tool encodes the composite pictures (1190 . . . 1196), including different sections (1122) of the input picture (1112), as part of different video streams (1160 . . . 1166).

Finally, the stream configuration tool buffers the encoded data (1180 . . . 1186). The encoded data (1180 . . . 1186) can be directly sent to one or more playback tools. In most configurations, however, the encoded data (1180 . . . 1186) is sent to a media server. The media server can also store a manifest file with details about the sections (1122) and streams.

C. Example of Composite Picture

Figure 12:
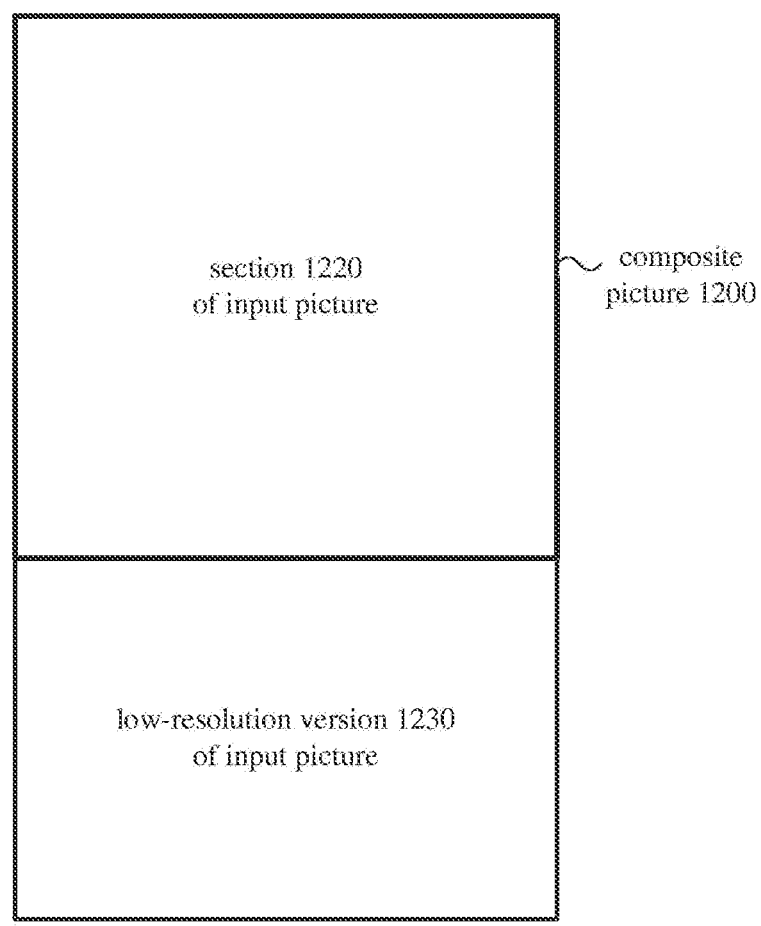
FIG. 12 is a diagram illustrating an example composite picture of panoramic video.

FIG. 12 is a diagram illustrating an example composite picture (1200) of panoramic video. The composite picture (1200) includes a section (1220) of an input picture. For example, the section (1220) is a high-resolution section partitioned from an input picture in an equirectangular projection, cubemap projection, sinusoidal projection, or other projection. The composite picture (1200) also includes a low-resolution version (1230) of the input picture. The low-resolution version (1230) of the input picture depicts the entire input picture, albeit at a lower spatial resolution than the original input picture. The low-resolution version (1230) of the input picture can be in an equirectangular projection, cubemap projection, sinusoidal projection, or other projection. In FIG. 12, the low-resolution version (1230) of the input picture is below the section (1220) of the input picture. Alternatively, the composite picture (1200) can be organized in some other way.

D. First Example of Playback Operations for Adaptive Streaming of Panoramic Video with Composite Pictures FIG. 13*a* shows a first example (1301) of playback operations for adaptive streaming of panoramic video with composite pictures. In the first example (1301), sections (1330) of a picture of panoramic video are in an equirectangular projection.

A playback tool periodically determines a view window (1311) in a spherical projection (1310) of the panoramic video for a viewer. During playback, the viewer can control view direction, relative to a viewer/camera position at the center of the panoramic video. The viewer may also be able to control the field of view (e.g., narrow, wide) and/or zoom factor. The view window (1311) depends on view direction, and can also depend on field of view and/or zoom factor.

The playback tool also requests a manifest file from a media server (or stream configuration tool). After receiving the manifest file, the playback tool identifies which sections of the panoramic video are to be used to create an output picture (1390) for the view window (1311). Specifically, the playback tool identifies one or more sections that each contain at least part of the view window (1311). FIG. 13*a* shows non-overlapping sections (1330) of a picture of panoramic video. In FIG. 13*a*, one of the sections (1330)—section 4—contains the view window (1311), which is shown as a projection (1334) onto the picture of panoramic video. The playback tool selects one or more bitstreams for the identified section(s), respectively.

The playback tool requests encoded data for the selected bitstream(s). For example, depending on configuration, the playback tool requests the encoded data from the stream configuration tool or a media server. The playback tool can request encoded data for the selected bitstream(s) on a picture-by-picture basis or some other basis. In the example (1301) of FIG. 13*a*, the playback tool requests encoded data (1354) for bitstream 4.

The playback tool receives and decodes the encoded data for the selected bitstream(s), thereby reconstructing composite picture(s) that include the identified section(s). In the example (1301) of FIG. 13*a*, the playback tool decodes the encoded data (1354) for bitstream 4 to reconstruct a composite picture (1364) that includes section 4.

The playback tool creates an output picture (1390) for the view window (1311) from the reconstructed section(s) and/or the reconstructed low-resolution version of the input picture. For a normal mode of output picture creation, the reconstructed high-resolution section(s) of the composite picture(s) support rendering of high-resolution views/details from the content of the section(s). In FIG. 13*a*, the reconstructed section(s) include section 4. For locations of the output picture (1390), the playback tool selects sample values at corresponding locations of the reconstructed section(s), or determines sample values at the corresponding locations by interpolating between adjacent sample values of the reconstructed section(s). So long as the view window (1311) falls within the reconstructed section(s), the playback tool can render a high-quality view.

If the view window (1311) falls outside the reconstructed section(s), however, the playback tool uses a fallback mode of output picture creation. In the fallback mode, the playback tool can render low-quality views/details from the low-resolution version of the composite picture(s), without requesting additional content from the stream configuration tool or media server. For locations of the output picture (1390), the playback tool selects sample values at corresponding locations of the reconstructed low-resolution version of the input picture, or determines sample values at the corresponding locations by interpolating between adjacent sample values of the reconstructed low-resolution version of the input picture. The playback tool can scale up, etc. the low-resolution version of the input picture before rendering. Thus, the low-resolution version of the input picture supports rendering of lower-resolution views/details, as needed, if the view direction or zoom factor dramatically changes or encoded data for a high-resolution section is lost. In this way, rendering operations are not interrupted during playback, although quality of rendered views may temporarily suffer.

The output picture (1390) can be in a screen projection (for display) or other (e.g., equirectangular) projection (for subsequent rendering). To find the corresponding locations in the reconstructed section(s) and/or reconstructed low-resolution version of the input picture, the playback tool can warp between different projections, e.g., from a screen projection for the output picture to an equirectangular projection for the sections (1330). The playback tool can also perform various post-processing operations (e.g., color conversion to a color space appropriate for a display device).

During playback, if the view window (1311) changes, the playback tool can identify new sections/bitstreams to be used to create an output picture (1390) for the view window (1311). If there is a sudden, dramatic change in view direction and/or zoom factor, or if encoded data for a high-resolution section is lost, however, the playback tool can render views/details from the low-resolution version of the input picture until encoded data for high-resolution section(s) is retrieved or recovered. In this way, the playback tool can hide network latency and stream switching latency from the viewer, and disruption of playback is avoided.

E. Second Example of Playback Operations for Adaptive Streaming of Panoramic Video with Composite Pictures FIG. 13*b* shows a second example (1302) of playback operations for adaptive streaming of panoramic video with composite pictures. In the second example (1302), overlapping sections (1331) of a picture of panoramic video are in a sinusoidal projection. The overlapping sections (1331) of the picture of panoramic video can be organized as described with reference to the example (602) of FIG. 6*b* and example (1102) of FIG. 11*b*.

As in the example (1301) of FIG. 13*a*, a playback tool periodically determines a view window (1311) in a spherical projection (1310) of the panoramic video for a viewer. After receiving a manifest file, the playback tool identifies which of the overlapping sections (1331) of the panoramic video are to be used to create an output picture (1392) for the view window (1311). Specifically, the playback tool identifies one or more of the overlapping sections (1331) that each contain at least part of the view window (1311). In FIG. 13*b*, two of the overlapping sections (1331)—sections 2 and 6—each contain at least part of the view window (1311), which is shown as a projection (1332) onto the picture of panoramic video. The playback tool selects one or more bitstreams for the identified section(s), respectively.

The playback tool requests encoded data for the selected bitstream(s), generally as described with reference to FIG. 13*a*. In the example (1302) of FIG. 13*b*, the playback tool requests encoded data (1352) for bitstream 2 and requests encoded data (1356) for bitstream 6. The playback tool receives and decodes the encoded data for the selected bitstream(s), thereby reconstructing composite picture(s) that include the identified section(s). In the example (1302) of FIG. 13*b*, the playback tool decodes the encoded data (1352) for bitstream 2 to reconstruct a composite picture (1362) that includes section 2, and the playback tool decodes the encoded data (1356) for bitstream 6 to reconstruct a composite picture (1366) that includes section 6.

The playback tool creates an output picture (1392) for the view window (1311) from the reconstructed section(s) and/or the reconstructed low-resolution version of the input picture, generally as described with reference to FIG. 13*a*. For a normal mode of output picture creation, the reconstructed high-resolution section(s) of the composite picture(s) support rendering of high-resolution views/details from the content of the section(s). In FIG. 13*b*, the reconstructed section(s) include section 2 and section 6. So long as the view window (1311) falls within the reconstructed section(s), the playback tool can render a high-quality view. If the view window (1311) falls outside the reconstructed section(s) (in FIG. 6, sections 2 and 6), the playback tool uses a fallback mode of output picture creation. In the fallback mode, the playback tool can render low-quality views/details from the low-resolution version of the composite picture(s), without requesting additional content from the stream configuration tool or media server. Thus, the low-resolution version of the input picture supports rendering of lower-resolution views/details, as needed, if the view direction or zoom factor dramatically changes or encoded data for a high-resolution section is lost. To find the corresponding locations in the reconstructed section(s) and/or reconstructed low-resolution version of the input picture, the playback tool can warp between different projections, e.g., from a screen projection for the output picture to a sinusoidal projection for the overlapping sections (1331).

X. Example Techniques for Stream Configuration of Panoramic Video with Composite Pictures FIG. 14 shows an example technique (1400) for stream configuration of panoramic video with composite pictures. A panoramic video stream configuration tool as described with reference to FIG. 4, or other panoramic video stream configuration tool, can perform the example technique (1400).

The stream configuration tool receives (1410) an input picture of panoramic video. Typically, the input picture is in an input projection such as an equirectangular projection, a cubemap projection, or a sinusoidal projection. The input picture has a spatial resolution such as 4K or higher.

The stream configuration tool creates (1420) a low-resolution version of the input picture. For example, the stream configuration tool downsamples the input picture horizontally and/or vertically. The low-resolution version of the input picture can be in an input projection (e.g., an equirectangular projection, a cubemap projection, or a sinusoidal projection) or intermediate projection (e.g., a sinusoidal projection). In general, the low-resolution version of the input picture has a lower spatial resolution than the input picture.

The stream configuration tool also splits (1430) the input picture into multiple sections according to partition settings. The sections can be overlapping sections, as described above, or non-overlapping sections. For example, the partition settings include the count of sections, sizes of sections, positions of sections, and extent of overlap between sections. In some configurations, the stream configuration tool projects the input picture from an input projection to an intermediate projection when splitting the input picture into multiple sections (in the intermediate projection). For example, the input projection (for the input picture and low-resolution version of the input picture) is an equirectangular projection or a cubemap projection, and the intermediate projection is a sinusoidal projection. When the multiple sections are in a sinusoidal projection, at least one of the multiple sections may include at least some sample values having default values (e.g., black values or gray values, not representing content of the input picture of panoramic video). In general, each of the sections has a spatial resolution that is lower than the spatial resolution of the input picture, but may be higher or lower than the spatial resolution of the low-resolution version of the input picture.

The stream configuration tool creates (1440) multiple composite pictures. Each of the composite pictures includes one of the multiple sections and also includes the low-resolution version of the input picture. For example, within each of the composite pictures, the low-resolution version of the input picture is adjacent one of the sections. Within each of the composite pictures, the low-resolution version of the input picture can be positioned at a pre-defined location relative to the one of the multiple sections. Alternatively, for each of the composite pictures, one of the multiple sections provides a first view of a frame packing arrangement, and the low-resolution version of the input picture provides a second view of the frame packing arrangement. Alternatively, the composite pictures are organized in some other way. The stream configuration tool adds (1450) the multiple composite pictures, respectively, to corresponding video streams for encoding.

FIG. 14 shows two loops. As part of a loop for a formatting pipeline, the stream configuration tool checks (1460) whether to continue operations for a next input picture. If so, the stream configuration tool receives (1410) the next input picture, creates (1420) a low-resolution version of the next input picture, splits (1430) the next input picture into multiple sections, creates (1440) composite pictures for the next input picture, and adds (1450) the composite pictures to corresponding video streams. In this way, the stream configuration tool iteratively creates composite pictures and adds them to corresponding video streams.

As part of an encoding pipeline, the stream configuration tool encodes (1470) the multiple composite pictures in the corresponding video streams, respectively, for an input picture. This produces encoded data for the composite pictures as part of multiple bitstreams for the corresponding video streams, respectively. Typically, the bitstreams are video elementary bitstreams. The encoded data in the video elementary bitstreams can be multiplexed into a single container stream for delivery to a media server. The stream configuration tool stores (1480) the encoded data for delivery (e.g., to a media server, or directly to one or more panoramic video playback tools). The stream configuration tool checks (1490) whether to continue encoding operations and, if so, encodes (1470) the composite pictures for the next input picture. In this way, as part of a loop for the encoding pipeline, the stream configuration tool encodes the composite pictures added to video streams in the formatting pipeline.

The stream configuration tool can also produce one or more manifest files. The manifest file(s) include information indicating, for each of the multiple bitstreams, the position of one of the multiple sections (in terms of an input projection or spherical projection) whose content is part of the corresponding video stream for that bitstream. For example, for each section, the manifest file includes phi and theta coordinates for the section. The manifest file(s) can also include information that indicates where the low-resolution version of the input picture is positioned in the composite pictures, respectively. The stream configuration tool can deliver the manifest file(s) to a media server, for subsequent delivery to one or more playback tools. Or, the stream configuration tool can directly deliver the manifest file(s) to one or more playback tools. The manifest file(s) can be delivered as user data of elementary bitstreams, as metadata in a container, or in some other way. Alternatively, the stream configuration tool and playback tool(s) can operate without exchanging information in manifest file(s), and input pictures are partitioned into sections according to a static, pre-defined pattern.

XI. Example Techniques for Playback of Panoramic Video with Composite Pictures

FIG. 15 shows an example technique (1500) for playback of panoramic video with composite pictures. A panoramic video playback tool as described with reference to FIG. 5, or other panoramic video playback tool, can perform the example technique (1500).

The panoramic video playback tool determines (1510) a view window for playback of panoramic video. For example, the view window depends on view direction, field of view, and/or zoom factor. The playback tool can receive an indication of a view direction for an application. For example, the indication of the view direction is a set of heading, pitch, and roll values for the view direction. Or, the indication of the view direction is a set of affine transform coefficients that specify a spatial rotation for the view direction. Or, the view direction is specified in some other way. The playback tool can receive the indication of the view direction from the application or from a source specified by the application. The playback tool can also receive an indication of a field of view and/or zoom factor for the application.

From among multiple sections of the panoramic video, the playback tool identifies (1520) one or more sections that contain at least part of the view window. The sections can be overlapping sections, which reduces incidence of disruption attributable to bitstream switching, or non-overlapping sections. For example, the playback tool identifies each of the multiple sections that contains at least part of the view window. For the identified section(s), the playback tool selects (1530) one or more bitstreams among multiple bitstreams for corresponding video streams.

FIG. 15 shows two loops. As part of a loop for a view window pipeline, the playback tool checks (1540) whether there has been a change to the view window (e.g., due to a change in view direction, field of view, or zoom factor). If so, the playback tool determines (1510) the view window, identifies (1520) the section(s) that contain the view window, and selects (1530) the bitstream(s) for the identified section(s). In this way, the playback tool can iteratively perform operations to determine (1510) the view window, identify (1520) the section(s) that contain at least part of the view window, and select (1530) the bitstream(s) for the identified section(s).

As part a decoding and reconstruction pipeline, the playback tool requests (1550) encoded data, in the selected bitstream(s) for the identified section(s), respectively, for an input picture of the panoramic video. Depending on configuration, the playback tool can request the encoded data from a media server or directly from a panoramic video stream configuration tool. The playback tool can make separate requests for portions of an input picture or for each input picture, or the playback tool can batch requests.

Each of the identified section(s) is part of a composite picture that also includes a low-resolution version of an input picture. Each composite picture includes one of the multiple sections and also includes the low-resolution version of the input picture. For example, for each composite picture, the low-resolution version of the input picture is adjacent one of the multiple sections within the composite picture. For each composite picture, the low-resolution version of the input picture and the one of the multiple sections can be located at pre-defined positions within the composite picture. Alternatively, for each composite picture, one of the multiple sections provides a first view of a frame packing arrangement, and the low-resolution version of the input picture provides a second view of the frame packing arrangement. Alternatively, the composite pictures are organized in some other way.

Typically, the input picture is in an input projection such as an equirectangular projection, a cubemap projection, or a sinusoidal projection. The input picture has a spatial resolution such as 4K or higher. The low-resolution version of the input picture can be in an input projection (e.g., an equirectangular projection, a cubemap projection, or a sinusoidal projection) or intermediate projection (e.g., a sinusoidal projection). In general, the low-resolution version of the input picture has a lower spatial resolution than the input picture. In general, each of the multiple sections has a spatial resolution that is lower than the spatial resolution of the input picture, but may be higher or lower than the spatial resolution of the low-resolution version of the input picture.

The playback tool receives (1560) the encoded data (e.g., from a media server, or directly from a panoramic video stream configuration tool). The playback tool decodes (1570) the encoded data to reconstruct sample values for the identified section(s) for the input picture and/or reconstruct sample values for the low-resolution version of the input picture. For example, the playback tool reconstructs both the identified section(s) and the low-resolution version of the input picture. Or, if the view window is entirely contained by the identified section(s), the playback tool reconstructs only the identified section(s). Or, if the view window has changed dramatically and is completely outside of the identified section(s), the playback tool reconstructs only the low-resolution version of the input picture.

Then, based at least in part on the reconstructed section(s) and/or the reconstructed low-resolution version of the input picture, the playback tool creates (1580) an output picture. For example, the playback tool determines which portions of the output picture cannot be created using the reconstructed section(s) and, for any portion of the output picture that cannot be created using the reconstructed section(s), creates that portion of the output picture using the reconstructed low-resolution version of the input picture. Thus, the output picture can be created using only the reconstructed section(s). Or, the output picture can be created using only the reconstructed low-resolution version of the input picture. Or, at least part of the output picture can be created using the one or more reconstructed sections, and at least part of the output picture can be created using the reconstructed low-resolution version of the input picture.

When creating the output picture, the playback tool can project the reconstructed section(s) and/or the reconstructed low-resolution version of the input picture from an intermediate projection (e.g., sinusoidal projection) to an output projection (e.g., screen projection). Or, when creating the output picture, the playback tool can project the reconstructed section(s) and/or the reconstructed low-resolution version of the input picture from an input projection (e.g., equirectangular projection, cubemap projection, sinusoidal projection) to an output projection (e.g., screen projection).

The playback tool stores (1590) the output picture for output to a display device. The playback tool checks (1595) whether to continue decoding and reconstruction operations and, if so, requests (1550) and decodes (1570) encoded data for one or more sections of the next input picture. In this way, as part of a loop for the decoding and reconstruction pipeline, the playback tool reconstructs sections identified in the view window pipeline.

The playback tool can receive one or more manifest files (e.g., from a media server or directly from a stream configuration tool). The manifest file(s) include information indicating, for each of the multiple bitstreams, the position of one of the multiple sections (in terms of an input projection or spherical projection) whose content is part of the corresponding video stream for that bitstream. For example, for each section, the manifest file includes phi and theta coordinates for the section. The playback tool can use the manifest file(s) to identify (1520) the section(s) that contain at least part of the view window and/or select (1530) the bitstream(s) for the identified sections. The playback tool can also use the manifest file(s) when creating (1580) the output picture based on the reconstructed section(s) and/or reconstructed low-resolution version of the input picture. The manifest file(s) can also include information that indicates where the low-resolution version of the input picture is positioned in the composite pictures, respectively. The manifest file(s) can be delivered as user data of elementary bitstreams, as metadata in a container, or in some other way. Alternatively, the stream configuration tool and playback tool(s) can operate without exchanging information in manifest file(s), and input pictures are partitioned into sections according to a static, pre-defined pattern.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising:
   one or more processing units; and
   memory storing instructions that, when executed by the one or more processing units, causes the computer system to:
   create a first version of a panoramic image by sampling a second version of the panoramic image, wherein:
   the first version of the panoramic image has a first resolution;
   the second version of the panoramic image has a second resolution; and
   the first resolution is lower than the second resolution;
   split the second version of the panoramic image into multiple sections associated with different view directions;
   create multiple composite images, wherein:
   each composite image of the multiple composite images includes a respective section of the multiple sections and an entirety of the first version of the panoramic image;
   the respective section included in the composite image is associated with a view window and enables the view window to be output at the second resolution; and
   the entirety of the first version of the panoramic image included in the composite image enables the panoramic image to be output at the first resolution based on the view window changing;

produce encoded versions of the multiple composite images by encoding the multiple composite images in corresponding video streams; and store the encoded versions of the multiple composite images for delivery.

2. The computer system of claim 1, wherein the respective section included in the composite image provides a first view of a frame packing arrangement and the entirety of the first version of the panoramic image provides a second view of the frame packing arrangement.

3. The computer system of claim 1, wherein, for the composite image, the entirety of the first version of the panoramic image is positioned at a pre-defined location relative to the respective section included in the composite image.

4. The computer system of claim 1, wherein:
the first version of the panoramic image and the second version of the panoramic image are in an input projection; and
the instructions further cause the computing system to project the second version of the panoramic image from the input projection to an intermediate projection, the multiple sections being in the intermediate projection.

5. The computer system of claim 4, wherein:
the input projection is an equirectangular projection; and
the intermediate projection is a sinusoidal projection in which at least some sample values of the second version of the panoramic image have default values not representing content of the panoramic image.

6. The computer system of claim 1, wherein the multiple sections are non-overlapping sections.

7. The computer system of claim 1, wherein the multiple sections are overlapping sections and a setting indicates an extent of overlap between two sections.

8. The computer system of claim 1, wherein the sampling is associated with a spherical projection that maps values to locations that are equally distant from a central view position.

9. A method comprising:
creating a first version of a panoramic image by sampling a second version of the panoramic image, wherein:
the first version of the panoramic image has a first resolution;
the second version of the panoramic image has a second resolution; and
the first resolution is lower than the second resolution;
splitting the second version of the panoramic image into multiple sections associated with different view directions;
creating multiple composite images, wherein:
each composite image of the multiple composite images includes a respective section of the multiple sections and an entirety of the first version of the panoramic image;
the respective section included in the composite image is associated with a view window and enables the view window to be output at the second resolution; and
the entirety of the first version of the panoramic image included in the composite image enables the panoramic image to be output at the first resolution based on the view window changing;
producing encoded versions of the multiple composite images by encoding the multiple composite images in corresponding video streams; and
storing the encoded versions of the multiple composite images for delivery.

10. The method of claim 9, wherein the respective section included in the composite image provides a first view of a frame packing arrangement and the entirety of the first version of the panoramic image provides a second view of the frame packing arrangement.

11. The method of claim 9, wherein, for the composite image, the entirety of the first version of the panoramic image is positioned at a pre-defined location relative to the respective section included in the composite image.

12. The method of claim 9, wherein:
the first version of the panoramic image and the second version of the panoramic image are in an input projection; and
the method further comprises projecting the second version of the panoramic image from the input projection to an intermediate projection, the multiple sections being in the intermediate projection.

13. The method of claim 12, wherein:
the input projection is an equirectangular projection; and
the intermediate projection is a sinusoidal projection in which at least some sample values of the second version of the panoramic image have default values not representing content of the panoramic image.

14. The method of claim 9, wherein the multiple sections are non-overlapping sections.

15. The method of claim 9, wherein the multiple sections are overlapping sections and a setting indicates an extent of overlap between two sections.

16. The method of claim 9, wherein the sampling is associated with a spherical projection that maps values to locations that are equally distant from a central view position.

17. Computer-readable media, storing instructions that, when executed by a processing unit, cause a system to perform operations comprising:
creating a first version of a panoramic image by sampling a second version of the panoramic image, wherein:
the first version of the panoramic image has a first resolution;
the second version of the panoramic image has a second resolution; and
the first resolution is lower than the second resolution;
splitting the second version of the panoramic image into multiple sections associated with different view directions;
creating multiple composite images, wherein:
each composite image of the multiple composite images includes a respective section of the multiple sections and an entirety of the first version of the panoramic image;
the respective section included in the composite image is associated with a view window and enables the view window to be output at the second resolution; and
the entirety of the first version of the panoramic image included in the composite image enables the panoramic image to be output at the first resolution based on the view window changing;
producing encoded versions of the multiple composite images by encoding the multiple composite images in corresponding video streams; and
storing the encoded versions of the multiple composite images for delivery.

18. The computer-readable media of claim 17, wherein the multiple sections are non-overlapping sections.

19. The computer-readable media of claim 17, wherein the multiple sections are overlapping sections and a setting indicates an extent of overlap between two sections.

20. The computer-readable media of claim 17, wherein the sampling is associated with a spherical projection that maps values to locations that are equally distant from a central view position.

* * * * *